United States Patent
Xue et al.

(10) Patent No.: US 10,334,393 B2
(45) Date of Patent: Jun. 25, 2019

(54) FLOOR POSITIONING METHOD AND SYSTEM, AND DEVICE

(71) Applicant: HUAWEI TECHNOLOGIES CO., LTD., Shenzhen, Guangdong (CN)

(72) Inventors: Jiantao Xue, Beijing (CN); Bin Su, Shenzhen (CN); Jie Cui, Shenzhen (CN); Anjian Li, Beijing (CN); Yijie Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/020,174

(22) Filed: Jun. 27, 2018

(65) Prior Publication Data
US 2018/0310122 A1   Oct. 25, 2018

Related U.S. Application Data

(63) Continuation of application No. PCT/CN2015/099189, filed on Dec. 28, 2015.

(51) Int. Cl.
*H04W 4/02* (2018.01)
*H04W 4/33* (2018.01)
*H04B 17/318* (2015.01)

(52) U.S. Cl.
CPC ............ *H04W 4/02* (2013.01); *H04B 17/318* (2015.01); *H04W 4/33* (2018.02)

(58) Field of Classification Search
CPC ......... H04W 84/12; H04W 4/80; H04W 4/02; H04W 64/00; H04W 4/029; H04W 4/33; H04W 4/025
See application file for complete search history.

(56) References Cited

U.S. PATENT DOCUMENTS

2008/0026770 A1 * 1/2008 Rudravaram ......... G01S 5/0289
455/456.1
2009/0017841 A1   1/2009 Lewis et al.
(Continued)

FOREIGN PATENT DOCUMENTS

CN           101019444 A      8/2007
CN           102170698 A      8/2011
(Continued)

OTHER PUBLICATIONS

International Search Report dated Sep. 21, 2016 in corresponding International Patent Application No. PCT/CN2015/099189.
(Continued)

*Primary Examiner* — Nam T Huynh
(74) *Attorney, Agent, or Firm* — Staas & Halsey LLP

(57) ABSTRACT

Embodiments of the present disclosure provide a floor positioning method and system, and a device, and relate to the communications field. The method includes: receiving a reference signal sent by at least one access point in an indoor environment in which UE is located; determining measurement information based on a polarization direction of the at least one received reference signal, where the measurement information includes at least one access point identifier and a proportion-related value of a vertical polarization direction relative to the polarization direction of the reference signal corresponding to the at least one access point identifier; sending the measurement information to a positioning server; and receiving location information of the UE sent by the positioning server, where the location information of the UE includes a floor location of the UE, and the floor location of the UE is determined based on the measurement information.

14 Claims, 9 Drawing Sheets

(56) References Cited

U.S. PATENT DOCUMENTS

| | | | |
|---|---|---|---|
| 2011/0181483 A1 | 7/2011 | Krapf et al. | |
| 2012/0315991 A1 | 12/2012 | Rofougaran et al. | |
| 2014/0022539 A1 | 1/2014 | France | |
| 2015/0065162 A1* | 3/2015 | Azami | H04W 4/04 455/456.1 |

FOREIGN PATENT DOCUMENTS

| | | |
|---|---|---|
| CN | 102197536 A | 9/2011 |
| CN | 103916821 A | 7/2014 |
| CN | 104918323 A | 9/2015 |

OTHER PUBLICATIONS

International Search Report dated Sep. 21, 2016 in corresponding International Patent Application No. PCT/CN2015/099189, 7 pgs.
Written Opinion of the International Search Authority dated Sep. 21, 2016 in corresponding International Patent Application No. PCT/CN2015/099189, 3 pgs.
Extended European Search Report, dated Sep. 20, 2018, in European Application No. 15911686.2 (6 pp.).

* cited by examiner

FLOOR POSITIONING METHOD AND SYSTEM, AND DEVICE

CROSS-REFERENCE TO RELATED APPLICATIONS

This application is a continuation of International Patent Application No. PCT/CN2015/099189, filed on Dec. 28, 2015, the disclosure of which is hereby incorporated by reference in its entirety.

TECHNICAL FIELD

The present disclosure relates to the communications field, and in particular, to a floor positioning method and system, and a device.

BACKGROUND

With development of communications technologies, a positioning technology is playing an increasingly important role. The positioning technology is a technology that is used to obtain location information (such as latitude and longitude coordinates) of user equipment (UE) by using a telecom or mobile operator network (such as an LTE network).

At present, a Global Positioning System (GPS) positioning technology is mainly used to position UE. However, the GPS technology cannot effectively implement indoor positioning because no satellite signal is received or a signal is excessively weak indoors. A common indoor positioning technology is positioning implemented based on an enhanced cell identification (ECID) positioning technology. The ECID positioning technology is a technology used to implement positioning by using measurement information such as a cell identity (Cell-ID), a reference signal received power (RSRP), and a time of arrival (TOA). It is assumed that UE enters a building having at least two floors, an access point is disposed on each floor in the building, and at least one access point sends, to the UE, a reference signal carrying a cell identity (ID) of a cell in which the access point is located. The UE reports measurement information of the reference signal to a positioning server, and the positioning server determines a location range of the UE based on the cell identity and the measurement information of the reference signal that is reported by the UE. For example, it is assumed that strengths of signals transmitted by access points are the same. The UE measures reference signals from access points on different indoor floors. The measurement information of the reference signal may include a receive power (RSRP) or a time of arrival (TOA) in the reference signal. The UE sends the measurement information of the reference signal and the ID of the access point to the positioning server; and the positioning server may sort RSRP values of the different access points in descending order, and use a floor on which an access point corresponding to a largest RSRP value is located, as a floor on which the UE is located. Alternatively, the positioning server may sort TOA values of the different access points in ascending order, and use a floor on which an access point corresponding to a smallest TOA value is located, as a floor on which the UE is located.

In the prior art, RSRPs (or TOAs) are measured and are sorted, where a larger RSRP (a smaller TOA) indicates a shorter distance to an access point; and a location of an access point nearest to UE is selected as a location of the UE. If an access point on a same floor as the UE is relatively far from the UE but an access point on a different floor from the UE is relatively near to the UE, incorrect floor positioning is performed on the UE, and consequently floor information of the UE is estimated incorrectly.

SUMMARY

To resolve a problem in a related technology that floor information of UE is estimated incorrectly, embodiments of the present disclosure provide a floor positioning method and system, and a device.

According to a first aspect, a floor positioning method is provided, applied to user equipment (UE), including:

receiving a reference signal sent by at least one access point in an indoor environment in which the UE is located;

determining measurement information based on a polarization direction of the at least one received reference signal, where the measurement information includes at least one access point identifier and a proportion-related value of a vertical polarization direction relative to the polarization direction of the reference signal corresponding to the at least one access point identifier;

sending the measurement information to a positioning server; and receiving location information of the UE sent by the positioning server, where the location information of the UE includes a floor location of the UE, and the floor location of the UE is determined based on the measurement information.

Optionally, the determining measurement information based on a polarization direction of the at least one received reference signal includes:

determining a degree of direction approximation between a polarization direction and a vertical polarization direction of a first reference signal, where the first reference signal is sent by one of the at least one access point;

determining a degree of direction approximation between the polarization direction and a horizontal polarization direction of the first reference signal, where the horizontal polarization direction is perpendicular to the vertical polarization direction;

determining whether the degree of direction approximation between the polarization direction and the vertical polarization direction of the first reference signal is higher than the degree of direction approximation between the polarization direction and the horizontal polarization direction of the first reference signal; and when the degree of direction approximation between the polarization direction and the vertical polarization direction of the first reference signal is higher than the degree of direction approximation between the polarization direction and the horizontal polarization direction of the first reference signal, determining a proportion-related value of the vertical polarization direction relative to the polarization direction of the first reference signal as 1; or when the degree of direction approximation between the polarization direction and the vertical polarization direction of the first reference signal is not higher than the degree of direction approximation between the polarization direction and the horizontal polarization direction of the first reference signal, determining a proportion-related value of the vertical polarization direction relative to the polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the determining measurement information based on a polarization direction of the at least one received reference signal includes:

determining a signal strength of a first reference signal that is received by the UE by using the vertical polarization antenna, where the first reference signal is sent by one of the at least one access point;

determining whether the signal strength of the first reference signal that is received by using the vertical polarization antenna is greater than a preset vertical polarization signal threshold; and when the signal strength of the first reference signal that is received by using the vertical polarization antenna is greater than the preset vertical polarization signal threshold, determining a proportion-related value of a vertical polarization direction relative to a polarization direction of the first reference signal as 1; or when the signal strength of the first reference signal that is received by using the vertical polarization antenna is not greater than the preset vertical polarization signal threshold, determining a proportion-related value of a vertical polarization direction relative to a polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the determining measurement information based on a polarization direction of the at least one received reference signal includes:

determining a signal strength of a first reference signal that is received by the UE by using the vertical polarization antenna, where the first reference signal is sent by one of the at least one access point;

determining a signal strength of the first reference signal that is received by the UE by using the horizontal polarization antenna; and determining a proportion-related value X of a vertical polarization direction relative to a polarization direction of the first reference signal according to a proportion-related value formula, where the proportion-related value formula is:

$$X = \arctan(M/N), \text{ where}$$

M is the signal strength of the first reference signal that is received by the UE by using the vertical polarization antenna, and N is the signal strength of the first reference signal that is received by the UE by using the horizontal polarization antenna.

Optionally, the measurement information further includes a measurement value of a preset measurement parameter of the reference signal corresponding to the at least one access point identifier, and the preset measurement parameter includes at least one of a reference signal received power (RSRP), a time of arrival (TOA), and an angle of arrival (AOA).

According to a second aspect, a floor positioning method is provided, applied to a positioning server, including:

receiving measurement information sent by user equipment (UE), where the measurement information is determined, after the UE receives a reference signal sent by at least one access point in an indoor environment in which the UE is located, based on a polarization direction of the at least one received reference signal, and the measurement information includes at least one access point identifier and a proportion-related value of a vertical polarization direction relative to the polarization direction of the reference signal corresponding to the at least one access point identifier;

determining a floor location of the UE based on the measurement information; and sending location information of the UE to the UE, where the location information of the UE includes the floor location of the UE.

Optionally, the determining a floor location of the UE based on the measurement information includes:

determining a target access point identifier from the at least one access point identifier based on the proportion-related value of the vertical polarization direction relative to the polarization direction of the reference signal corresponding to the at least one access point identifier;

querying for a preset correspondence between an access point identifier and a floor based on the target access point identifier; and determining a floor corresponding to the target access point identifier as the floor location of the UE.

Optionally, the determining a target access point identifier from the at least one access point identifier based on the proportion-related value of the vertical polarization direction relative to the polarization direction of the reference signal corresponding to the at least one access point identifier includes:

using an access point identifier, in the at least one access point identifier, corresponding to a largest proportion-related value of a vertical polarization direction as the target access point identifier.

Optionally, the measurement information further includes a measurement value of a preset measurement parameter of the reference signal corresponding to the at least one access point identifier, and the preset measurement parameter includes at least one of a reference signal received power (RSRP), a time of arrival (TOA), and an angle of arrival (AOA).

the determining a target access point identifier from the at least one access point identifier based on the proportion-related value of the vertical polarization direction relative to the polarization direction of the reference signal corresponding to the at least one access point identifier includes:

obtaining a measurement value of a preset measurement parameter corresponding to each of the at least one access point identifier;

obtaining, through sorting based on the measurement value, a first priority corresponding to each access point identifier;

obtaining, through sorting based on the proportion-related value of the vertical polarization direction, a second priority corresponding to each access point identifier;

obtaining a weighted average value of the first priority corresponding to each access point identifier and the second priority corresponding to each access point identifier, to obtain a target priority of each access point identifier; and using, as the target access point identifier, an access point identifier with a highest target priority in the at least one access point identifier.

In the first aspect and the second aspect, for example, it is assumed that a floor positioning system includes one UE, n access points, and one positioning server. The UE receives m reference signals, where 1≤m≤n; and the UE generates measurement information, where the measurement information includes m access point identifiers and proportion-related values of vertical polarization directions relative to polarization directions of reference signals (that is, m reference signals) corresponding to the m access point identifiers. In the example, signals from a same device, that is, a transmit end, are considered as a same signal, and information from a same device, that is, a transmit end, is considered as same information.

According to a third aspect, user equipment (UE) is provided, including a transmitter, a receiver, and a processor, where the receiver is configured to receive a reference signal sent by at least one access point in an indoor environment in which the UE is located;

the processor is configured to determine measurement information based on a polarization direction of the at least one received reference signal, where the measurement information includes at least one access point identifier and a proportion-related value of a vertical polarization direction relative to the polarization direction of the reference signal corresponding to the at least one access point identifier;

the transmitter is configured to send the measurement information to a positioning server; and the receiver is further configured to receive location information of the UE sent by the positioning server, where the location information of the UE includes a floor location of the UE, and the floor location of the UE is determined based on the measurement information.

Optionally, the processor is configured to:

determine a degree of direction approximation between a polarization direction and a vertical polarization direction of a first reference signal, where the first reference signal is sent by one of the at least one access point;

determine a degree of direction approximation between the polarization direction and a horizontal polarization direction of the first reference signal, where the horizontal polarization direction is perpendicular to the vertical polarization direction; determine whether the degree of direction approximation between the polarization direction and the vertical polarization direction of the first reference signal is higher than the degree of direction approximation between the polarization direction and the horizontal polarization direction of the first reference signal; and when the degree of direction approximation between the polarization direction and the vertical polarization direction of the first reference signal is higher than the degree of direction approximation between the polarization direction and the horizontal polarization direction of the first reference signal, determine a proportion-related value of the vertical polarization direction relative to the polarization direction of the first reference signal as 1; or when the degree of direction approximation between the polarization direction and the vertical polarization direction of the first reference signal is not higher than the degree of direction approximation between the polarization direction and the horizontal polarization direction of the first reference signal, determine a proportion-related value of the vertical polarization direction relative to the polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the processor is configured to:

determine a signal strength of a first reference signal that is received by the UE by using the vertical polarization antenna, where the first reference signal is sent by one of the at least one access point;

determine whether the signal strength of the first reference signal that is received by using the vertical polarization antenna is greater than a preset vertical polarization signal threshold; and when the signal strength of the first reference signal that is received by using the vertical polarization antenna is greater than the preset vertical polarization signal threshold, determine a proportion-related value of a vertical polarization direction relative to a polarization direction of the first reference signal as 1; or when the signal strength of the first reference signal that is received by using the vertical polarization antenna is not greater than the preset vertical polarization signal threshold, determine a proportion-related value of a vertical polarization direction relative to a polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the processor is configured to:

determine a signal strength of a first reference signal that is received by the UE by using the vertical polarization antenna, where the first reference signal is sent by one of the at least one access point;

determine a signal strength of the first reference signal that is received by the UE by using the horizontal polarization antenna; and determine a proportion-related value X of a vertical polarization direction relative to a polarization direction of the first reference signal according to a proportion-related value formula, where the proportion-related value formula is:

$$X=\arctan(M/N), \text{ where}$$

M is the signal strength of the first reference signal that is received by the UE by using the vertical polarization antenna, and N is the signal strength of the first reference signal that is received by the UE by using the horizontal polarization antenna.

Optionally, the measurement information further includes a measurement value of a preset measurement parameter of the reference signal corresponding to the at least one access point identifier, and the preset measurement parameter includes at least one of a reference signal received power (RSRP), a time of arrival (TOA), and an angle of arrival (AOA).

According to a fourth aspect, a positioning server is provided, including a transmitter, a receiver, and a processor, where the receiver is configured to receive measurement information sent by user equipment (UE), where the measurement information is determined, after the UE receives a reference signal sent by at least one access point in an indoor environment in which the UE is located, based on a polarization direction of the at least one received reference signal, and the measurement information includes at least one access point identifier and a proportion-related value of a vertical polarization direction relative to the polarization direction of the reference signal corresponding to the at least one access point identifier;

the processor is configured to determine a floor location of the UE based on the measurement information; and the transmitter is configured to send location information of the UE to the UE, where the location information of the UE includes the floor location of the UE.

Optionally, the processor is configured to:

determine a target access point identifier from the at least one access point identifier based on the proportion-related value of the vertical polarization direction relative to the polarization direction of the reference signal corresponding to the at least one access point identifier;

query a preset correspondence between an access point identifier and a floor based on the target access point identifier; and determine a floor corresponding to the target access point identifier as the floor location of the UE.

Optionally, the processor is configured to use an access point identifier, in the at least one access point identifier, corresponding to a largest proportion-related value of a vertical polarization direction as the target access point identifier.

Optionally, the measurement information further includes a measurement value of a preset measurement parameter of the reference signal corresponding to the at least one access point identifier, and the preset measurement parameter includes at least one of a reference signal received power (RSRP), a time of arrival (TOA), and an angle of arrival (AOA); and the processor is configured to:

obtain a measurement value of a preset measurement parameter corresponding to each of the at least one access point identifier;

obtain, through sorting based on the measurement value, a first priority corresponding to each access point identifier;

obtain, through sorting based on the proportion-related value of the vertical polarization direction, a second priority corresponding to each access point identifier;

obtain a weighted average value of the first priority corresponding to each access point identifier and the second priority corresponding to each access point identifier, to obtain a target priority of each access point identifier; and use, as the target access point identifier, an access point identifier with a highest target priority in the at least one access point identifier.

According to a fifth aspect, a floor positioning system is provided, including:

the UE according to any implementation of the third aspect;

the positioning server according to any implementation of the fourth aspect; and at least one access point.

According to a sixth aspect, a floor positioning method is provided, applied to user equipment (UE), including:

receiving a reference signal sent by at least one access point in an indoor environment in which the UE is located;

determining a proportion-related value of a vertical polarization direction relative to a polarization direction of the at least one received reference signal, where the at least one reference signal is corresponding to at least one access point identifier;

determining a target access point identifier from the at least one access point identifier based on the proportion-related value of the vertical polarization direction relative to the polarization direction of the at least one received reference signal;

sending measurement information to a positioning server, where the measurement information includes the target access point identifier; and receiving location information of the UE sent by the positioning server, where the location information of the UE includes a floor location of the UE, and the floor location of the UE is determined based on the measurement information.

Optionally, the determining a target access point identifier from the at least one access point identifier based on the proportion-related value of the vertical polarization direction relative to the polarization direction of the at least one received reference signal includes:

using an access point identifier, in the at least one access point identifier, corresponding to a reference signal with a largest proportion-related value of a vertical polarization direction as the target access point identifier.

Optionally, the determining a target access point identifier from the at least one access point identifier based on the proportion-related value of the vertical polarization direction relative to the polarization direction of the at least one received reference signal includes:

obtaining a measurement value of a preset measurement parameter of the reference signal corresponding to the at least one access point identifier, where the preset measurement parameter includes at least one of a reference signal received power (RSRP), a time of arrival (TOA), and an angle of arrival (AOA);

obtaining, through sorting based on the measurement value, a first priority corresponding to each of the at least one received reference signal;

obtaining, through sorting based on the proportion-related value of the vertical polarization direction, a second priority corresponding to each reference signal;

obtaining a weighted average value of the first priority corresponding to each reference signal and the second priority corresponding to each reference signal, to obtain a target priority of each reference signal; and using an access point identifier, in the at least one access point identifier, corresponding to a reference signal with a highest target priority as the target access point identifier.

Optionally, the determining a proportion-related value of a vertical polarization direction relative to a polarization direction of the at least one received reference signal includes:

determining a degree of direction approximation between a polarization direction and a vertical polarization direction of a first reference signal, where the first reference signal is sent by one of the at least one access point;

determining a degree of direction approximation between the polarization direction and a horizontal polarization direction of the first reference signal, where the horizontal polarization direction is perpendicular to the vertical polarization direction;

determining whether the degree of direction approximation between the polarization direction and the vertical polarization direction of the first reference signal is higher than the degree of direction approximation between the polarization direction and the horizontal polarization direction of the first reference signal; and when the degree of direction approximation between the polarization direction and the vertical polarization direction of the first reference signal is higher than the degree of direction approximation between the polarization direction and the horizontal polarization direction of the first reference signal, determining a proportion-related value of the vertical polarization direction relative to the polarization direction of the first reference signal as 1; or when the degree of direction approximation between the polarization direction and the vertical polarization direction of the first reference signal is not higher than the degree of direction approximation between the polarization direction and the horizontal polarization direction of the first reference signal, determining a proportion-related value of the vertical polarization direction relative to the polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the determining a proportion-related value of a vertical polarization direction relative to a polarization direction of the at least one received reference signal includes:

determining a signal strength of a first reference signal that is received by the UE by using the vertical polarization antenna, where the first reference signal is sent by one of the at least one access point;

determining whether the signal strength of the first reference signal that is received by using the vertical polarization antenna is greater than a preset vertical polarization signal threshold; and when the signal strength of the first reference signal that is received by using the vertical polarization antenna is greater than the preset vertical polarization signal threshold, determining a proportion-related value of a vertical polarization direction relative to a polarization direction of the first reference signal as 1; or when the signal strength of the first reference signal that is received by using the vertical polarization antenna is not greater than the preset vertical polarization signal threshold, determining a proportion-related value of a vertical polarization direction relative to a polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the determining a proportion-related value of a vertical polarization direction relative to a polarization direction of the at least one received reference signal includes:

determining a signal strength of a first reference signal that is received by the UE by using the vertical polarization antenna, where the first reference signal is sent by one of the at least one access point;

determining a signal strength of the first reference signal that is received by the UE by using the horizontal polarization antenna; and determining a proportion-related value X of a vertical polarization direction relative to a polarization direction of the first reference signal according to a proportion-related value formula, where the proportion-related value formula is:

$X = \arctan(M/N)$, where

M is the signal strength of the first reference signal that is received by the UE by using the vertical polarization antenna, and N is the signal strength of the first reference signal that is received by the UE by using the horizontal polarization antenna.

According to a seventh aspect, a floor positioning method is provided, applied to a positioning server, including:

receiving measurement information sent by user equipment (UE), where the measurement information includes a target access point identifier, the target access point identifier is determined, after the UE receives a reference signal sent by at least one access point in an indoor environment in which the UE is located and a proportion-related value of a vertical polarization direction relative to a polarization direction of the at least one received reference signal is determined, from at least one access point identifier based on the proportion-related value of the vertical polarization direction relative to the polarization direction of the at least one received reference signal, and the at least one reference signal is corresponding to the at least one access point identifier;

determining a floor location of the UE based on the measurement information; and sending location information of the UE to the UE, where the location information of the UE includes the floor location of the UE.

Optionally, the determining a floor location of the UE based on the measurement information includes:

querying for a preset correspondence between an access point identifier and a floor based on the target access point identifier; and determining a floor corresponding to the target access point identifier as the floor location of the UE.

In the sixth aspect and the seventh aspect, for example, it is assumed that a floor positioning system includes one UE, n access points, and one positioning server. The UE receives m reference signals, where 1≤m≤n; and the UE generates measurement information, where the measurement information includes a target access point identifier, and there is usually one target access point identifier. In the example, signals from a same device, that is, a transmit end, are considered as a same signal, and information from a same device, that is, a transmit end, is considered as same information.

According to an eighth aspect, user equipment (UE) is provided, including a transmitter, a receiver, and a processor, where the receiver is configured to receive a reference signal sent by at least one access point in an indoor environment in which the UE is located;

the processor is configured to determine a proportion-related value of a vertical polarization direction relative to a polarization direction of the at least one received reference signal, where the at least one reference signal is corresponding to at least one access point identifier;

the processor is further configured to determine a target access point identifier from the at least one access point identifier based on the proportion-related value of the vertical polarization direction relative to the polarization direction of the at least one received reference signal;

the transmitter is configured to send measurement information to a positioning server, where the measurement information includes the target access point identifier; and the receiver is further configured to receive location information of the UE sent by the positioning server, where the location information of the UE includes a floor location of the UE, and the floor location of the UE is determined based on the measurement information.

Optionally, the processor is configured to:

use an access point identifier, in the at least one access point identifier, corresponding to a reference signal with a largest proportion-related value of a vertical polarization direction as the target access point identifier.

Optionally, the processor is configured to:

obtain a measurement value of a preset measurement parameter of the reference signal corresponding to the at least one access point identifier, where the preset measurement parameter includes at least one of a reference signal received power (RSRP), a time of arrival (TOA), and an angle of arrival (AOA);

obtain, through sorting based on the measurement value, a first priority corresponding to each of the at least one received reference signal;

obtain, through sorting based on the proportion-related value of the vertical polarization direction, a second priority corresponding to each reference signal;

obtain a weighted average value of the first priority corresponding to each reference signal and the second priority corresponding to each reference signal, to obtain a target priority of each reference signal; and use an access point identifier, in the at least one access point identifier, corresponding to a reference signal with a highest target priority as the target access point identifier.

Optionally, the processor is configured to:

determine a degree of direction approximation between a polarization direction and a vertical polarization direction of a first reference signal, where the first reference signal is sent by one of the at least one access point;

determine a degree of direction approximation between the polarization direction and a horizontal polarization direction of the first reference signal, where the horizontal polarization direction is perpendicular to the vertical polarization direction;

determine whether the degree of direction approximation between the polarization direction and the vertical polarization direction of the first reference signal is higher than the degree of direction approximation between the polarization direction and the horizontal polarization direction of the first reference signal; and when the degree of direction approximation between the polarization direction and the vertical polarization direction of the first reference signal is higher than the degree of direction approximation between the polarization direction and the horizontal polarization direction of the first reference signal, determine a proportion-related value of the vertical polarization direction relative to the polarization direction of the first reference signal as 1; or when the degree of direction approximation between the polarization direction and the vertical polarization direction of the first reference signal is not higher than the degree of direction approximation between the polarization direction and the horizontal polarization direction of the first reference signal, determine a proportion-related value of the vertical polarization direction relative to the polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the processor is configured to:

determine a signal strength of a first reference signal that is received by the UE by using the vertical polarization antenna, where the first reference signal is sent by one of the at least one access point;

determine whether the signal strength of the first reference signal that is received by using the vertical polarization antenna is greater than a preset vertical polarization signal threshold; and when the signal strength of the first reference signal that is received by using the vertical polarization antenna is greater than the preset vertical polarization signal threshold, determine a proportion-related value of a vertical polarization direction relative to a polarization direction of the first reference signal as 1; or when the signal strength of the first reference signal that is received by using the vertical polarization antenna is not greater than the preset vertical polarization signal threshold, determine a proportion-related value of a vertical polarization direction relative to a polarization direction of the first reference signal as 0.

Optionally, a vertical polarization antenna and a horizontal polarization antenna are disposed in the UE; and the processor is configured to:

determine a signal strength of a first reference signal that is received by the UE by using the vertical polarization antenna, where the first reference signal is sent by one of the at least one access point;

determine a signal strength of the first reference signal that is received by the UE by using the horizontal polarization antenna; and determine a proportion-related value X of a vertical polarization direction relative to a polarization direction of the first reference signal according to a proportion-related value formula, where the proportion-related value formula is:

$$X = \arctan(M/N), \text{ where}$$

M is the signal strength of the first reference signal that is received by the UE by using the vertical polarization antenna, and N is the signal strength of the first reference signal that is received by the UE by using the horizontal polarization antenna.

According to a ninth aspect, a positioning server is provided, including a transmitter, a receiver, and a processor, where the receiver is configured to receive measurement information sent by user equipment (UE), where the measurement information includes a target access point identifier, the target access point identifier is determined, after the UE receives a reference signal sent by at least one access point in an indoor environment in which the UE is located and a proportion-related value of a vertical polarization direction relative to a polarization direction of the at least one received reference signal is determined, from at least one access point identifier based on the proportion-related value of the vertical polarization direction relative to the polarization direction of the at least one received reference signal, and the at least one reference signal is corresponding to the at least one access point identifier;

the processor is configured to determine a floor location of the UE based on the measurement information; and the transmitter is configured to send location information of the UE to the UE, where the location information of the UE includes the floor location of the UE.

Optionally, the processor is configured to:

query a preset correspondence between an access point identifier and a floor based on the target access point identifier; and determine a floor corresponding to the target access point identifier as the floor location of the UE.

According to a tenth aspect, a floor positioning system is provided, including:

the UE according to any implementation of the eighth aspect;

the positioning server according to any implementation of the ninth aspect; and at least one access point.

According to an eleventh aspect, a floor positioning method is provided, applied to an access point, including:

receiving a reference signal sent by UE in an indoor environment in which the access point is located;

determining measurement information based on a polarization direction of the received reference signal, where the measurement information includes an access point identifier of the access point and a proportion-related value of a vertical polarization direction relative to the polarization direction of the reference signal corresponding to the access point identifier; and sending the measurement information to a positioning server, so that the positioning server determines a floor location of the UE based on the measurement information, and sends the floor location of the UE to the UE.

Optionally, the determining measurement information based on a polarization direction of the received reference signal includes:

determining a degree of direction approximation between the polarization direction and the vertical polarization direction of the reference signal;

determining a degree of direction approximation between the polarization direction and a horizontal polarization direction of the reference signal, where the horizontal polarization direction is perpendicular to the vertical polarization direction;

determining whether the degree of direction approximation between the polarization direction and the vertical polarization direction of the reference signal is higher than the degree of direction approximation between the polarization direction and the horizontal polarization direction of the reference signal; and when the degree of direction approximation between the polarization direction and the vertical polarization direction of the reference signal is higher than the degree of direction approximation between the polarization direction and the horizontal polarization direction of the reference signal, determining the proportion-related value of the vertical polarization direction relative to the polarization direction of the reference signal as 1; or when the degree of direction approximation between the polarization direction and the vertical polarization direction of the reference signal is not higher than the degree of direction approximation between the polarization direction and the horizontal polarization direction of the reference signal, determining the proportion-related value of the vertical polarization direction relative to the polarization direction of the reference signal as 0.

Optionally, a vertical polarization antenna and a horizontal polarization antenna are disposed in the access point, and a signal sending/receiving direction of the vertical polarization antenna is perpendicular to that of the horizontal polarization antenna; and the determining measurement information based on a polarization direction of the received reference signal includes:

determining a signal strength of the reference signal that is received by the access point by using the vertical polarization antenna; and determining whether the signal strength of the reference signal that is received by using the vertical polarization antenna is greater than a preset vertical polarization signal threshold; and when the signal strength of the reference signal that is received by using the vertical polarization antenna is greater than the preset vertical polarization signal threshold, determining the proportion-related value of the vertical polarization direction relative to the polarization direction of the reference signal as 1; or when the signal strength of the reference signal that is received by using the vertical polarization antenna is not greater than the preset vertical polarization signal threshold, determining the proportion-related value of the vertical polarization direction relative to the polarization direction of the reference signal as 0.

Optionally, a vertical polarization antenna and a horizontal polarization antenna are disposed in the access point, and a signal sending/receiving direction of the vertical polarization antenna is perpendicular to that of the horizontal polarization antenna; and the determining measurement information based on a polarization direction of the received reference signal includes:

determining a signal strength of the reference signal that is received by the access point by using the vertical polarization antenna; and determining a signal strength of the reference signal that is received by the access point by using the horizontal polarization antenna; and determining the proportion-related value X of the vertical polarization direction relative to the polarization direction of the reference signal according to a proportion-related value formula, where the proportion-related value formula is:

$$X = \arctan(M/N), \text{ where}$$

M is the signal strength of the reference signal that is received by the access point by using the vertical polarization antenna, and N is the signal strength of the reference signal that is received by the access point by using the horizontal polarization antenna.

Optionally, the measurement information further includes a measurement value of a preset measurement parameter of the reference signal corresponding to the access point identifier, and the preset measurement parameter includes at least one of a reference signal received power (RSRP), a time of arrival (TOA), and an angle of arrival (AOA).

According to a twelfth aspect, a floor positioning method is provided, applied to a positioning server, including:

receiving measurement information sent by at least one access point, where the at least one piece of received measurement information is determined, after the at least one access point receives a reference signal sent by UE in an indoor environment in which the at least one access point is located, based on a polarization direction of the received reference signal, and each piece of measurement information includes an access point identifier and a proportion-related value of a vertical polarization direction relative to the polarization direction of the reference signal corresponding to the access point identifier;

determining a floor location of the UE based on the at least one piece of received measurement information; and sending location information of the UE to the UE, where the location information of the UE includes the floor location of the UE.

Optionally, the determining a floor location of the UE based on the at least one piece of received measurement information includes:

determining a target access point identifier based on the proportion-related value of the vertical polarization direction relative to the polarization direction of the reference signal corresponding to the access point identifier in the at least one piece of received measurement information;

querying for a preset correspondence between an access point identifier and a floor based on the target access point identifier; and determine a floor corresponding to the target access point identifier as the floor location of the UE.

Optionally, the determining a target access point identifier based on the proportion-related value of the vertical polarization direction relative to the polarization direction of the reference signal corresponding to the access point identifier in the at least one piece of received measurement information includes:

using an access point identifier, in the at least one piece of received measurement information, corresponding to a largest proportion-related value of a vertical polarization direction as the target access point identifier.

Optionally, each piece of measurement information further includes a measurement value of a preset measurement parameter of the reference signal corresponding to the access point identifier, and the preset measurement parameter includes at least one of a reference signal received power (RSRP), a time of arrival (TOA), and an angle of arrival (AOA).

the determining a target access point identifier based on the proportion-related value of the vertical polarization direction relative to the polarization direction of the reference signal corresponding to the access point identifier in the at least one piece of received measurement information includes:

obtaining a measurement value of a preset measurement parameter corresponding to each access point identifier in the at least one piece of received measurement information;

obtaining, through sorting based on the measurement value, a first priority corresponding to each access point identifier;

obtaining, through sorting based on the proportion-related value of the vertical polarization direction, a second priority corresponding to each access point identifier;

obtaining a weighted average value of the first priority corresponding to each access point identifier and the second priority corresponding to each access point identifier, to obtain a target priority of each access point identifier; and using an access point identifier with a highest target priority as the target access point identifier.

In the eleventh aspect and the twelfth aspect, for example, it is assumed that a floor positioning system includes one UE, n access points, and one positioning server. Each of the n access points may receive a reference signal sent by the UE; and generates measurement information, where the measurement information includes an access point identifier of the access point and a proportion-related value of a vertical polarization direction relative to a polarization direction of the reference signal corresponding to the access point identifier. The n access points send a total of n pieces of measurement information to the positioning server; and the positioning server receives p pieces of measurement information, and determines a floor location of the UE based on the p pieces of measurement information, where 1≤p≤n. In the example, signals from a same device, that is, a transmit end, are considered as a same signal, and information from a same device, that is, a transmit end, is considered as same information.

According to a thirteenth aspect, an access point is provided, including a transmitter, a receiver, and a processor, where the receiver is configured to receive a reference signal sent by UE in an indoor environment in which the access point is located;

the processor is configured to determine measurement information based on a polarization direction of the received reference signal, where the measurement information includes an access point identifier of the access point and a proportion-related value of a vertical polarization direction relative to the polarization direction of the reference signal corresponding to the access point identifier; and the transmitter is configured to send the measurement information to a positioning server, so that the positioning server determines a floor location of the UE based on the measurement information, and sends the floor location of the UE to the UE.

Optionally, the processor is configured to:

determine a degree of direction approximation between the polarization direction and the vertical polarization direction of the reference signal;

determine a degree of direction approximation between the polarization direction and a horizontal polarization direction of the reference signal, where the horizontal polarization direction is perpendicular to the vertical polarization direction;

determine whether the degree of direction approximation between the polarization direction and the vertical polarization direction of the reference signal is higher than the degree of direction approximation between the polarization direction and the horizontal polarization direction of the reference signal; and when the degree of direction approximation between the polarization direction and the vertical polarization direction of the reference signal is higher than the degree of direction approximation between the polarization direction and the horizontal polarization direction of the reference signal, determine the proportion-related value of the vertical polarization direction relative to the polarization direction of the reference signal as 1; or when the degree of direction approximation between the polarization direction and the vertical polarization direction of the reference signal is not higher than the degree of direction approximation between the polarization direction and the horizontal polarization direction of the reference signal, determine the proportion-related value of the vertical polarization direction relative to the polarization direction of the reference signal as 0.

Optionally, a vertical polarization antenna and a horizontal polarization antenna are disposed in the access point, and a signal sending/receiving direction of the vertical polarization antenna is perpendicular to that of the horizontal polarization antenna; and the processor is configured to:

determine a signal strength of the reference signal that is received by the access point by using the vertical polarization antenna; and determine whether the signal strength of the reference signal that is received by using the vertical polarization antenna is greater than a preset vertical polarization signal threshold; and when the signal strength of the reference signal that is received by using the vertical polarization antenna is greater than the preset vertical polarization signal threshold, determine the proportion-related value of the vertical polarization direction relative to the polarization direction of the reference signal as 1; or when the signal strength of the reference signal that is received by using the vertical polarization antenna is not greater than the preset vertical polarization signal threshold, determine the proportion-related value of the vertical polarization direction relative to the polarization direction of the reference signal as 0.

Optionally, a vertical polarization antenna and a horizontal polarization antenna are disposed in the access point, and a signal sending/receiving direction of the vertical polarization antenna is perpendicular to that of the horizontal polarization antenna; and the processor is configured to:

determine a signal strength of the reference signal that is received by the access point by using the vertical polarization antenna; and determine a signal strength of the reference signal that is received by the access point by using the horizontal polarization antenna; and determine the proportion-related value X of the vertical polarization direction relative to the polarization direction of the reference signal according to a proportion-related value formula, where the proportion-related value formula is:

$$X = \arctan(M/N), \text{ where}$$

M is the signal strength of the reference signal that is received by the access point by using the vertical polarization antenna, and N is the signal strength of the reference signal that is received by the access point by using the horizontal polarization antenna.

Optionally, the measurement information further includes a measurement value of a preset measurement parameter of the reference signal corresponding to the access point identifier, and the preset measurement parameter includes at least one of a reference signal received power (RSRP), a time of arrival (TOA), and an angle of arrival (AOA).

According to a fourteenth aspect, a positioning server is provided, including a transmitter, a receiver, and a processor, where the receiver is configured to receive measurement information sent by at least one access point, where the at least one piece of received measurement information is determined, after the at least one access point receives a reference signal sent by UE in an indoor environment in which the at least one access point is located, based on a polarization direction of the received reference signal, and each piece of measurement information includes an access point identifier and a proportion-related value of a vertical polarization direction relative to the polarization direction of the reference signal corresponding to the access point identifier;

the processor is configured to determine a floor location of the UE based on the at least one piece of received measurement information; and the transmitter is configured to send location information of the UE to the UE, where the location information of the UE includes the floor location of the UE.

Optionally, the processor is configured to:

determine a target access point identifier based on the proportion-related value of the vertical polarization direction relative to the polarization direction of the reference signal corresponding to the access point identifier in the at least one piece of received measurement information;

query a preset correspondence between an access point identifier and a floor based on the target access point identifier; and determine a floor corresponding to the target access point identifier as the floor location of the UE.

Optionally, the processor is configured to:

use an access point identifier, in the at least one piece of received measurement information, corresponding to a largest proportion-related value of a vertical polarization direction as the target access point identifier.

Optionally, each piece of measurement information further includes a measurement value of a preset measurement parameter of the reference signal corresponding to the access point identifier, and the preset measurement parameter includes at least one of a reference signal received power (RSRP), a time of arrival (TOA), and an angle of arrival (AOA); and the processor is configured to:

obtain a measurement value of a preset measurement parameter corresponding to each access point identifier in the at least one piece of received measurement information;

obtain, through sorting based on the measurement value, a first priority corresponding to each access point identifier;

obtain, through sorting based on the proportion-related value of the vertical polarization direction, a second priority corresponding to each access point identifier;

obtain a weighted average value of the first priority corresponding to each access point identifier and the second priority corresponding to each access point identifier, to obtain a target priority of each access point identifier; and use an access point identifier with a highest target priority as the target access point identifier.

According to a fifteenth aspect, a floor positioning system is provided, including:

the access point according to any implementation of the thirteenth aspect;

the positioning server according to any implementation of the fourteenth aspect; and at least one UE.

In the embodiments of the present disclosure, the location information of the UE determined by the positioning server may not only include the floor location of the UE, but also include a horizontal location of the UE. For a method for determining the horizontal location of the UE, reference may be made to a related technology. This is not limited in the embodiments of the present disclosure.

It should be noted that, in the embodiments of the present disclosure, that the measurement parameter includes at least one of an RSRP, a TOA, and an AOA means that the measurement parameter may include only an RSRP, only a TOA, or only an AOA; may include an RSRP and a TOA, an RSRP and an AOA, or an TOA and an AOA; or may include all of an RSRP, a TOA, and an AOA. For a method for obtaining, through sorting based on the measurement value, the first priority corresponding to each of the at least one received reference signal in the embodiments of the present disclosure, reference may be made to a related technology. For example, the first priority corresponding to each of the at least one received reference signal is obtained through sorting in ascending order or in descending order based on the measurement value. However, in the embodiments of the present disclosure, a sorting manner of the measurement value is the same as that of the proportion-related value of the vertical polarization direction, so as to ensure effective calculation of the weighted average value.

In addition, the correspondence between an access point identifier and a floor may be a correspondence between an access point identifier and a height. The positioning server may determine, by querying for the correspondence between an access point identifier and a height, a height corresponding to the target access point; and convert the height into a floor through calculation and send the floor location of the UE including the floor to the UE; or directly send the floor location of the UE including the height to the UE.

It should be noted that, each access point described in the embodiments of the present disclosure is in a same indoor environment as the UE. In other words, the indoor environment in which the UE is located is the indoor environment in which the access point is located. That same to-be-positioned UE is the UE in the embodiments of the present disclosure is used as an example for description, and the measurement information is information obtained after processing is performed based on the polarization direction of the reference signal.

In the foregoing solutions, the UE can receive the reference signal sent by the at least one access point in the indoor environment in which the UE is located, determine the measurement information based on the polarization direction of the at least one received reference signal, and send the measurement information to the positioning server; and correspondingly, the positioning server can determine the floor location of the UE based on the measurement information. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 2-1 is a schematic flowchart of a floor positioning method according to an example embodiment of the present disclosure;

FIG. 2-2 is a schematic diagram of a polarization direction determining method according to an example embodiment of the present disclosure;

FIG. 2-3 is a schematic structural diagram of an environment of a floor positioning system used in a floor positioning method according to another example embodiment of the present disclosure;

FIG. 2-4 is a schematic flowchart of a floor positioning method according to an example embodiment of the present disclosure;

FIG. 3 is a schematic flowchart of a floor positioning method according to another example embodiment of the present disclosure;

FIG. 4 is a schematic flowchart of a floor positioning method according to still another example embodiment of the present disclosure;

DESCRIPTION OF EMBODIMENTS

To make the objectives, technical solutions, and advantages of the present disclosure clearer, the following further describes the embodiments of the present disclosure in detail with reference to the accompanying drawings.

Figure 1:
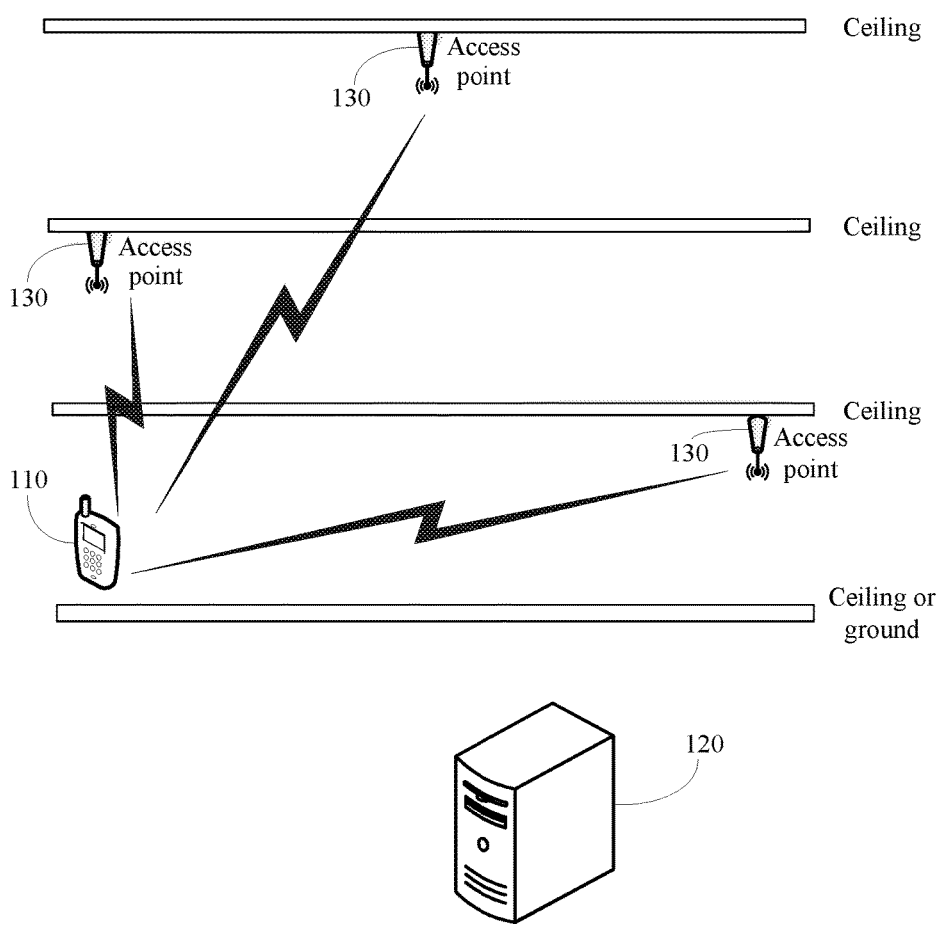
FIG. 1 is a schematic structural diagram of an environment of a floor positioning system used in a floor positioning method according to an embodiment of the present disclosure.

Referring to FIG. 1, FIG. 1 is a schematic structural diagram of an environment of a floor positioning system used in a floor positioning method according to an embodiment of the present disclosure. The floor positioning system includes UE 110, a positioning server 120, and at least one access point (AP) 130. In this embodiment of the present disclosure, the access point is a network-side transmit device, such as a macro base station, a micro base station, a pico base station, a femto base station, or a Wireless Fidelity (Wi-Fi) access point. In this embodiment of the present disclosure, the positioning server and the access point may be a same entity or different entities.

The UE 110 may be a mobile terminal or a fixed terminal, such as a smartphone, a computer, a multimedia player, an e-reader, or a wearable device. The positioning server 120 may be a server, a server cluster including several servers, or a cloud computing service center. The access point 130 may be a base station, and is disposed on a ceiling of a floor in a building having at least two floors. In this embodiment of the present disclosure, at least one access point 130 is disposed on a ceiling of each floor.

The UE 110 and the access point 130 may send a reference signal (RS) to each other, and the UE 110 may determine a location of the UE 110 by identifying a reference signal sent by the access point 130. A reference signal may also be referred to as a pilot signal, and is a known signal that is provided by a transmit end for a receive end to perform channel estimation or channel sounding. In this embodiment of the present disclosure, the reference signal may be used for channel sounding. A connection may be established between the UE 110 and the positioning server 120 through a wired network or a wireless network. A connection may be established between the access point 130 and the positioning server 120 through a wired network or a wireless network.

A signal transmit/receive antenna is disposed both in the UE 110 and the access point 130 that are shown in FIG. 1. Antenna polarization refers to a direction of an electric field formed during antenna radiation. Generally, when an electric field direction is perpendicular to the ground, an electromagnetic wave generated during antenna radiation is referred to as a vertical polarization wave; when an electric field direction is parallel to the ground, an electromagnetic wave generated during antenna radiation is referred to as a horizontal polarization wave. An electric field direction of a polarized electromagnetic wave is referred to as a polarization direction. An antenna radiates an electromagnetic wave in surrounding space. An electromagnetic wave includes an electric field and a magnetic field. According to a related technology, an electric field direction is an antenna polarization direction. A frequently used antenna is a single polarization antenna, and a single polarization antenna usually includes a vertical polarization antenna and a horizontal polarization antenna.

In this embodiment of the present disclosure, the positioning server or the UE needs to determine a spatial topology structure of an access point, and determine, based on the spatial topology structure of the access point, access points that are on a same floor or at a same height as the UE; and finally, the positioning server determines, as a floor location of the UE, a location of an access point that is on a same floor or at a same height as the UE. A spatial topology structure of the UE and the spatial topology structure of the access point is determined based on measurement information that is sent by the positioning server or the UE. In one aspect, the floor location of the UE may be determined by the UE by measuring a polarization direction of a reference signal sent by at least one access point in an indoor environment in which the UE is located. In the other aspect, the floor location of the UE may be determined by at least one access point after the at least one access point receives a reference signal sent by the UE in an indoor environment in which the at least one access point is located. A specific process may be as follows.

In the one aspect, when a spatial topology structure of an access point is determined by the UE by measuring a polarization direction of a reference signal sent by the at least one access point in an indoor environment in which the UE is located, to determine the floor location of the UE, the UE may determine a target access point identifier based on the reference signal, and the positioning server may determine the floor location of the UE based on the target access point identifier; or the positioning server may determine a target access point identifier, and the positioning server may determine the floor location of the UE based on the target access point identifier. The target access point is an access point, in an indoor environment (or in a building) in which the UE is located, that is most likely to be on a same floor or at a same height as the UE. For example, the target access point may be an access point disposed on a ceiling of a floor on which the UE is located. The present disclosure provides descriptions in the following two aspects.

Figures 1, 2:
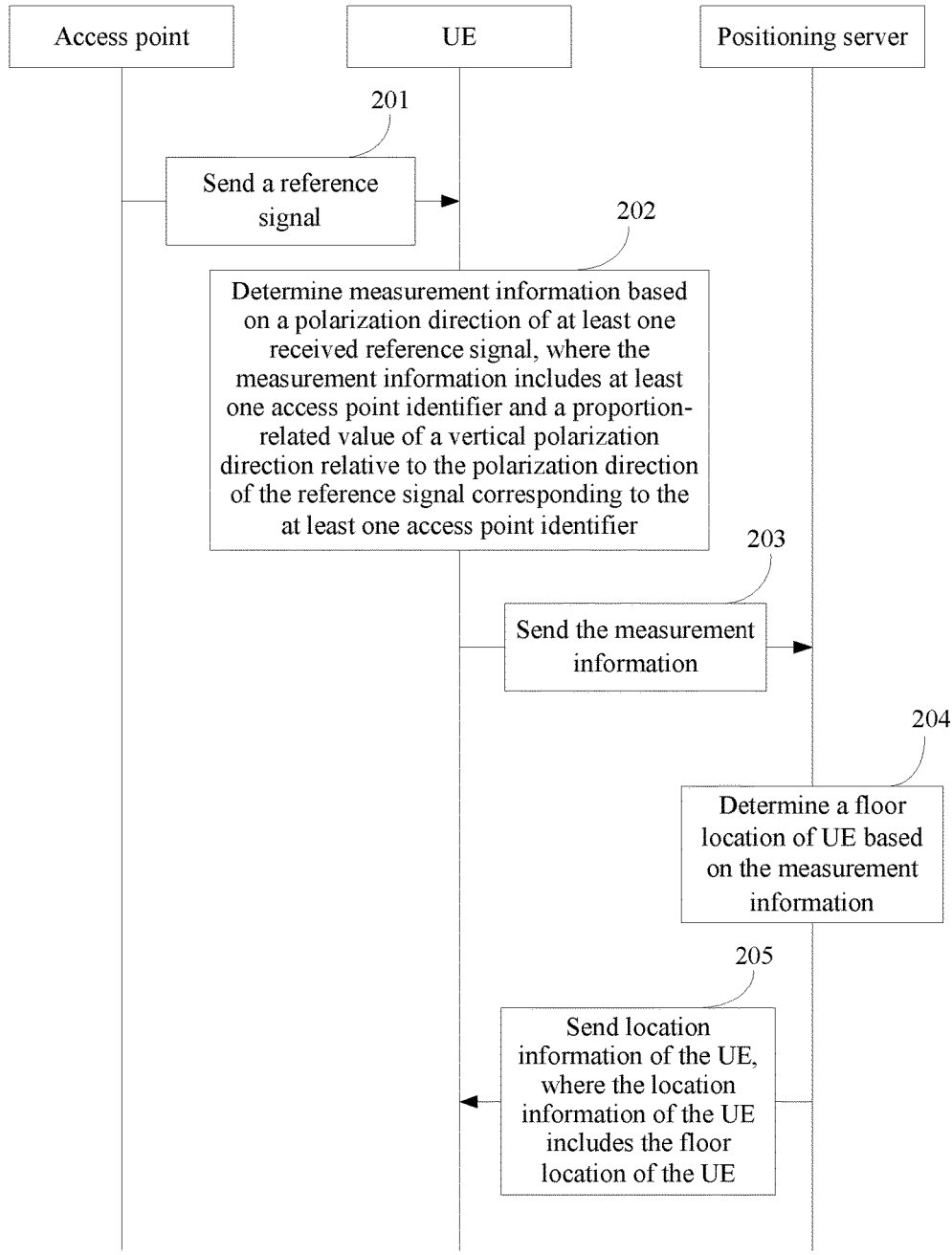
Figure 2:
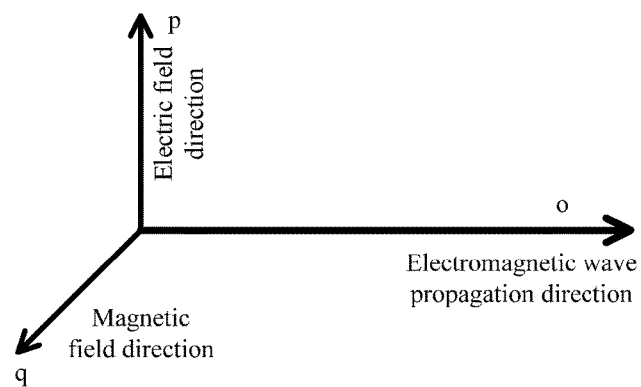

According to a first aspect, the present disclosure provides a floor positioning method. As shown in FIG. 2-1, the method includes:

Step 201: UE receives a reference signal sent by at least one access point in an indoor environment in which the UE is located.

In this embodiment of the present disclosure, the indoor environment in which the UE is located is a building having at least one floor, and at least one access point is disposed on a ceiling of each floor in the building. In FIG. 2-1, one of the at least one access point is used as an example for description. For operations of another access point, reference may be made to those of the access point shown in FIG. 2-1.

Step 202: The UE determines measurement information based on a polarization direction of the at least one received reference signal, where the measurement information includes at least one access point identifier and a proportion-related value of a vertical polarization direction relative to the polarization direction of the reference signal corresponding to the at least one access point identifier.

In actual application, when determining the measurement information based on the polarization direction of the at least one received reference signal, the UE may first obtain the at least one access point identifier; then determine the proportion-related value of the vertical polarization direction relative to the polarization direction of the at least one received reference signal, where the proportion-related value is used to reflect a proportion relationship between the vertical polarization direction and the polarization direction; and finally generate the measurement information based on the at least one access point identifier and the proportion-related value of the vertical polarization direction relative to the polarization direction of the at least one reference signal. There may be a plurality of methods for determining, by the UE, the proportion-related value of the vertical polarization direction relative to the polarization direction of the at least one received reference signal. This embodiment of the present disclosure provides descriptions by using the following three implementable manners as examples.

For example, in a first implementable manner, a method for determining, by the UE, the proportion-related value of the vertical polarization direction relative to the polarization direction of the at least one received reference signal may include the following steps.

Step A1: The UE determines a degree of direction approximation between a polarization direction and a vertical polarization direction of a first reference signal, where the first reference signal is sent by one of the at least one access point.

In this embodiment of the present disclosure, a vertical polarization direction is an electric field direction that is perpendicular to the ground, that is, a direction parallel to a gravity direction. As shown in FIG. 2-2, during an electromagnetic wave propagation process, an electromagnetic wave propagation direction o, an electric field direction p, and a magnetic field direction q are perpendicular to each other. When an electric field direction is being determined, a right-hand rule may be used. A right hand is stretched out to allow a thumb to be perpendicular to the four other fingers and the fingers to be on a same plane as a palm; and a magnetic field direction is allowed to pass through a center of the palm and the thumb is allowed to point to an electromagnetic wave propagation direction. In this case, a direction to which the four fingers point is the electric field direction. A polarization direction in this embodiment of the present disclosure is an electric field direction.

In this embodiment of the present disclosure, a degree of direction approximation is an approximation degree between two directions. A signal polarization direction, a signal vertical polarization direction, and a signal horizontal polarization direction may be all considered as vectors in this embodiment of the present disclosure. A vector refers to a geometric object with a magnitude (magnitude) and a direction. A degree of direction approximation between two vectors may be obtained through calculation based on a formula in a related technology, for example, a formula for calculating a correlation coefficient of a vector.

Figures 2, 3:
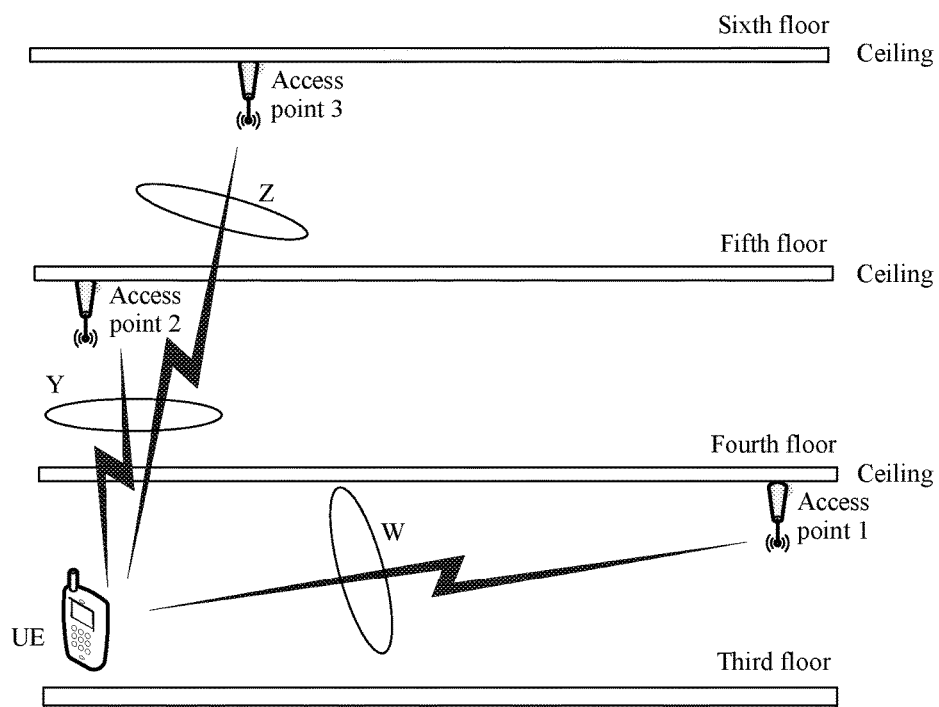

As shown in FIGS. 2-3, W, Y, and Z are respectively planes on which polarization directions of reference signals sent by access points 1 to 3 are located. In this embodiment of the present disclosure, an angle between a plane on which the polarization direction of the first reference signal is located and a plane on which the vertical polarization direction of the first reference signal is located may be used to determine the degree of direction approximation between the polarization direction and the vertical polarization direction of the first reference signal. The angle is negatively correlated with the degree of direction approximation. In other words, a smaller angle indicates a higher degree of direction approximation. Alternatively, a degree of strength approximation between a strength (also referred to as a magnitude) of the first reference signal in the polarization direction and a strength of the first reference signal in the vertical polarization direction may be used to determine the degree of direction approximation between the polarization direction and the vertical polarization direction of the first reference signal. The degree of strength approximation is positively correlated with the degree of direction approximation. In other words, a higher degree of strength approximation between the strength of the first reference signal in the polarization direction and the strength of the first reference signal in the vertical polarization direction indicates a higher degree of direction approximation. In actual application, a correlation coefficient, specific to the polarization direction and the vertical polarization direction of the first reference signal, obtained through calculation based on a formula for calculating a correlation coefficient of a vector may alternatively be determined as the degree of direction approximation described in step A1.

Step A2: The UE determines a degree of direction approximation between the polarization direction and a horizontal polarization direction of the first reference signal, where the horizontal polarization direction is perpendicular to the vertical polarization direction.

As shown in FIGS. 2-3, W, Y, and Z are respectively the planes on which the polarization directions of the reference signals sent by the access points 1 to 3 are located. In this embodiment of the present disclosure, an angle between the plane on which the polarization direction of the first reference signal is located and a plane on which the horizontal polarization direction of the first reference signal is located may be used to determine the degree of direction approximation between the polarization direction and the horizontal polarization direction of the first reference signal. The angle is negatively correlated with the degree of direction approximation. In other words, a smaller angle indicates a higher degree of direction approximation. Alternatively, a degree of strength approximation between the strength of the first reference signal in the polarization direction and a strength of the first reference signal in the horizontal polarization direction may be used to determine the degree of direction approximation between the polarization direction and the horizontal polarization direction of the first reference signal. The degree of strength approximation is positively correlated with the degree of direction approximation. In other words, a higher degree of strength approximation between the strength of the first reference signal in the polarization direction and the strength of the first reference signal in the horizontal polarization direction indicates a higher degree of direction approximation. In actual application, a correlation coefficient, specific to the polarization direction and the horizontal polarization direction of the first reference signal, obtained through calculation based on a formula for calculating a correlation coefficient of a vector may alternatively be determined as the degree of direction approximation described in step A2.

Step A3: The UE determines whether the degree of direction approximation between the polarization direction and the vertical polarization direction of the first reference signal is higher than the degree of direction approximation between the polarization direction and the horizontal polarization direction of the first reference signal.

In this embodiment of the present disclosure, the degree of direction approximation between the polarization direction and the vertical polarization direction of the first reference signal may be represented by a value obtained through calculation by using a preset algorithm, and the degree of direction approximation between the polarization direction and the horizontal polarization direction of the first reference signal may be represented by a value obtained through calculation by using the preset algorithm. Whether the degree of direction approximation between the polarization direction and the vertical polarization direction of the first reference signal is higher than the degree of direction approximation between the polarization direction and the horizontal polarization direction of the first reference signal is determined by comparing magnitudes of the two values.

Step A4: When the degree of direction approximation between the polarization direction and the vertical polarization direction of the first reference signal is higher than the degree of direction approximation between the polarization direction and the horizontal polarization direction of the first reference signal, the UE determines a proportion-related value of the vertical polarization direction relative to the polarization direction of the first reference signal as 1.

For example, it is assumed that the angle between the plane on which the polarization direction of the first reference signal is located and the plane on which the vertical polarization direction of the first reference signal is located is used to determine the degree of direction approximation between the polarization direction and the vertical polarization direction of the first reference signal, and the angle between the plane on which the polarization direction of the first reference signal is located and the plane on which the horizontal polarization direction of the first reference signal is located is used to determine the degree of direction approximation between the polarization direction and the horizontal polarization direction of the first reference signal. The angle between the plane on which the polarization direction of the first reference signal is located and the plane on which the vertical polarization direction of the first reference signal is located is 30°, and the angle between the plane on which the polarization direction of the first reference signal is located and the plane on which the horizontal polarization direction of the first reference signal is located is 60°. Because the angle is negatively correlated with the degree of direction approximation, the degree of direction approximation between the polarization direction and the vertical polarization direction of the first reference signal is higher than the degree of direction approximation between the polarization direction and the horizontal polarization direction of the first reference signal, and the UE determines the proportion-related value of the vertical polarization direction relative to the polarization direction of the first reference signal as 1.

Step A5: When the degree of direction approximation between the polarization direction and the vertical polarization direction of the first reference signal is not higher than the degree of direction approximation between the polarization direction and the horizontal polarization direction of the first reference signal, determine a proportion-related value of the vertical polarization direction relative to the polarization direction of the first reference signal as 0.

For example, it is assumed that the angle between the plane on which the polarization direction of the first reference signal is located and the plane on which the vertical polarization direction of the first reference signal is located is used to determine the degree of direction approximation between the polarization direction and the vertical polarization direction of the first reference signal, and the angle between the plane on which the polarization direction of the first reference signal is located and the plane on which the horizontal polarization direction of the first reference signal is located is used to determine the degree of direction approximation between the polarization direction and the horizontal polarization direction of the first reference signal. The angle between the plane on which the polarization direction of the first reference signal is located and the plane on which the vertical polarization direction of the first reference signal is located is 60°, and the angle between the plane on which the polarization direction of the first reference signal is located and the plane on which the horizontal polarization direction of the first reference signal is located is 30°. Because the angle is negatively correlated with the degree of direction approximation, the degree of direction approximation between the polarization direction and the vertical polarization direction of the first reference signal is not higher than the degree of direction approximation between the polarization direction and the horizontal polarization direction of the first reference signal, and the UE determines the proportion-related value of the vertical polarization direction relative to the polarization direction of the first reference signal as 0.

For example, in a floor positioning scenario shown in FIG. 2-3, it may be determined, according to steps A1 to A5, that proportion-related values of vertical polarization directions relative to the polarization directions of the reference signals sent by the access points 1 to 3 are 1, 0, and 0, respectively. It should be noted that, in the first implementable manner, the first reference signal is a reference signal from one access point, and the UE may process all other received reference signals in a same manner as the first reference signal.

In a second implementable manner, two single polarization antennas may be disposed in the UE: a vertical polarization antenna and a horizontal polarization antenna, and a signal sending/receiving direction of the vertical polarization antenna is perpendicular to that of the horizontal polarization antenna; and a method for determining, by the UE, the proportion-related value of the vertical polarization direction relative to the polarization direction of the at least one received reference signal may include the following steps.

Step B1: Determine a signal strength of a first reference signal that is received by the UE by using the vertical polarization antenna, where the first reference signal is sent by one of the at least one access point.

Step B2: Determine whether the signal strength of the first reference signal that is received by using the vertical polarization antenna is greater than a preset vertical polarization signal threshold.

Step B3: When the signal strength of the first reference signal that is received by using the vertical polarization antenna is greater than the preset vertical polarization signal threshold, determine a proportion-related value of a vertical polarization direction relative to a polarization direction of the first reference signal as 1.

Step B4: When the signal strength of the first reference signal that is received by using the vertical polarization antenna is not greater than the preset vertical polarization signal threshold, determine a proportion-related value of a vertical polarization direction relative to a polarization direction of the first reference signal as 0.

It should be noted that, in the second implementable manner, the first reference signal is a reference signal from a same access point, and the UE may process all other received reference signals in a same manner as the first reference signal.

For example, as shown in FIG. 2-3, it is assumed that an indoor environment in which the UE is located is a building having six floors. After entering the indoor environment, the UE receives reference signals respectively sent by access points 1 to 3 disposed on ceilings of a third floor to a fifth floor. Strengths of the reference signals that are sent by the access points 1 to 3 and that are received by the UE by using the vertical polarization antenna are 10 v/m (volt/meter), 3 v/m, and 5 v/m, respectively. It is assumed that a preset vertical polarization signal threshold is 8 v/m. The UE compares 8 v/m with each of the strengths of the reference signals sent by the access points 1 to 3: 10 v/m, 3 v/m, and 5 v/m, determines, as 1, a proportion-related value of a vertical polarization direction relative to a polarization direction of the reference signal that is sent by the access point 1 and whose strength is greater than the preset vertical polarization signal threshold 8 v/m, and determines, as 0, proportion-related values of vertical polarization directions relative to polarization directions of the reference signals that are sent by the access points 2 and 3 and whose strengths are less than the preset vertical polarization signal threshold 8 v/m.

In actual application, the UE may receive reference signals sent by access points in an indoor environment in which a plurality of UEs are located, but strengths of some reference signals are relatively weak due to a relatively long distance from the UEs or block of some obstacles. In this case, the UE may ignore a reference signal whose reference signal strength is less than the preset strength threshold, and process only a reference signal whose reference signal strength is greater than or equal to the preset strength threshold. For example, in FIG. 2-3, after entering an indoor environment, the UE may receive reference signals sent by access points disposed on ceilings of a first floor to a sixth floor. However, each access point is disposed on a ceiling, and when a reference signal passes through the ceiling, a relatively large penetration loss is caused, and therefore reference signals sent by access points on the first floor and the second floor are relatively weak. In addition, because an access point on the sixth floor is relatively far from the UE, a reference signal sent by the access point on the sixth floor is relatively weak. Assuming that the signal strengths of the reference signals sent by the access points on the first floor, the second floor, and the sixth floor are less than the preset strength threshold, the UE ignores the received reference signals sent by the access points on the first floor, the second floor, and the sixth floor, and processes only reference signals sent by the access points 1 to 3 on the ceilings on the third floor to the fifth floor. In this way, a process for processing an unwanted signal can be avoided, and load of the UE is reduced.

In a third implementable manner, a vertical polarization antenna and a horizontal polarization antenna are disposed in the UE, and a signal sending/receiving direction of the vertical polarization antenna is perpendicular to that of the horizontal polarization antenna; and a method for determining, by the UE, the proportion-related value of the vertical polarization direction relative to the polarization direction of the at least one received reference signal may include the following steps.

Step C1: Determine a signal strength of a first reference signal that is received by the UE by using the vertical polarization antenna, where the first reference signal is sent by one of the at least one access point.

Step C2: Determine a signal strength of the first reference signal that is received by the UE by using the horizontal polarization antenna.

Step C3: Determine a proportion-related value X of a vertical polarization direction relative to a polarization direction of the first reference signal according to a proportion-related value formula, where the proportion-related value formula is:

$$X = \arctan(M/N), \text{ where}$$

M is the signal strength of the first reference signal that is received by the UE by using the vertical polarization antenna, N is the signal strength of the first reference signal that is received by the UE by using the horizontal polarization antenna, and arctan(M/N) represents an arctangent function of M/N.

For example, as shown in FIG. 2-3, it is assumed that strengths of the reference signals that are sent by the access points 1 to 3 and that are received by the UE by using the vertical polarization antenna are 10 v/m, 3 v/m, and 5 v/m, respectively, and strengths of the reference signals that are sent by the access points 1 to 3 and that are received by the UE by using the horizontal polarization antenna are 1 v/m, 11 v/m, and 5 v/m, respectively. In this case, a proportion-related value of a vertical polarization direction relative to a polarization direction of a reference signal sent by the access point 1 is arctan(10/1)=arctan 10, a proportion-related value of a vertical polarization direction relative to a polarization direction of a reference signal sent by the access point 2 is arctan(3/11), and a proportion-related value of a vertical polarization direction relative to a polarization direction of a reference signal sent by the access point 3 is arctan(5/5) =arctan 1. It should be noted that, in the third implementable manner, the first reference signal is a reference signal from a same access point, and the UE may process all other received reference signals in a same manner as the first reference signal.

It should be noted that, for a method for obtaining at least one access point identifier by the UE, reference may be made to a related technology. For example, before sending a reference signal, each access point needs to send access-point positioning assistance information, where the access-point positioning assistance information carries an access point identifier and other related information. The UE receives, based on the access-point positioning assistance information, the reference signal sent by the corresponding access point, and can establish a correspondence between a reference signal and an access point identifier after receiving the reference signal. Therefore, the UE can finally determine, based on the at least one piece of received reference signal, the access point identifier corresponding to the at least one reference signal, to obtain the at least one access point identifier; and generate measurement information based on the at least one access point identifier and the proportion-related value that is of the vertical polarization direction relative to the polarization direction of the reference signal corresponding to the at least one access point identifier and that is obtained in any one of the foregoing three implementable manners.

Step 203: The UE sends the measurement information to a positioning server.

For example, the UE may send the measurement information to the positioning server by using a wireless connection established between the UE and the positioning server.

Step 204: The positioning server determines a floor location of the UE based on the measurement information.

Figures 2, 3, 4:
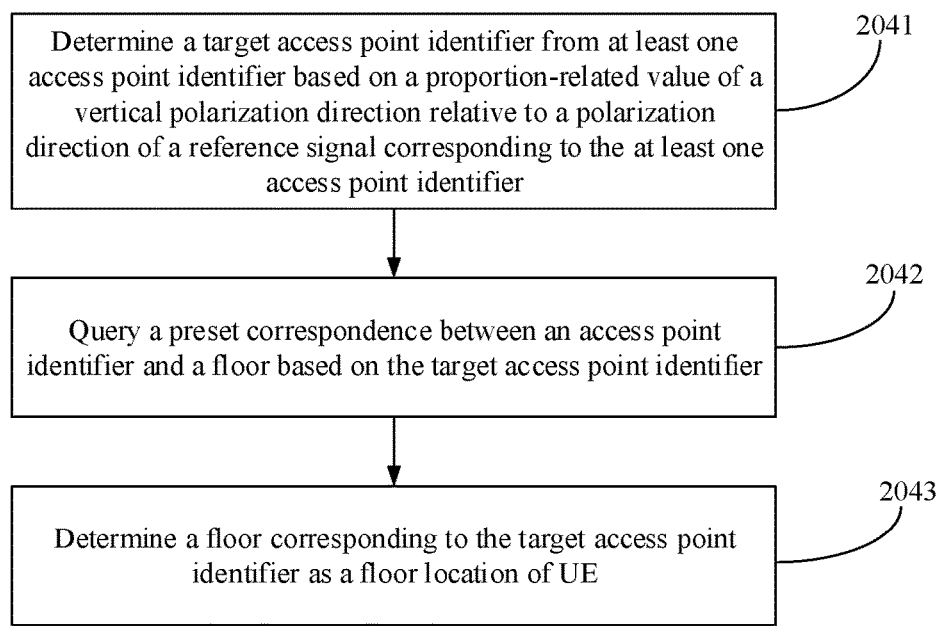
Figure 3:
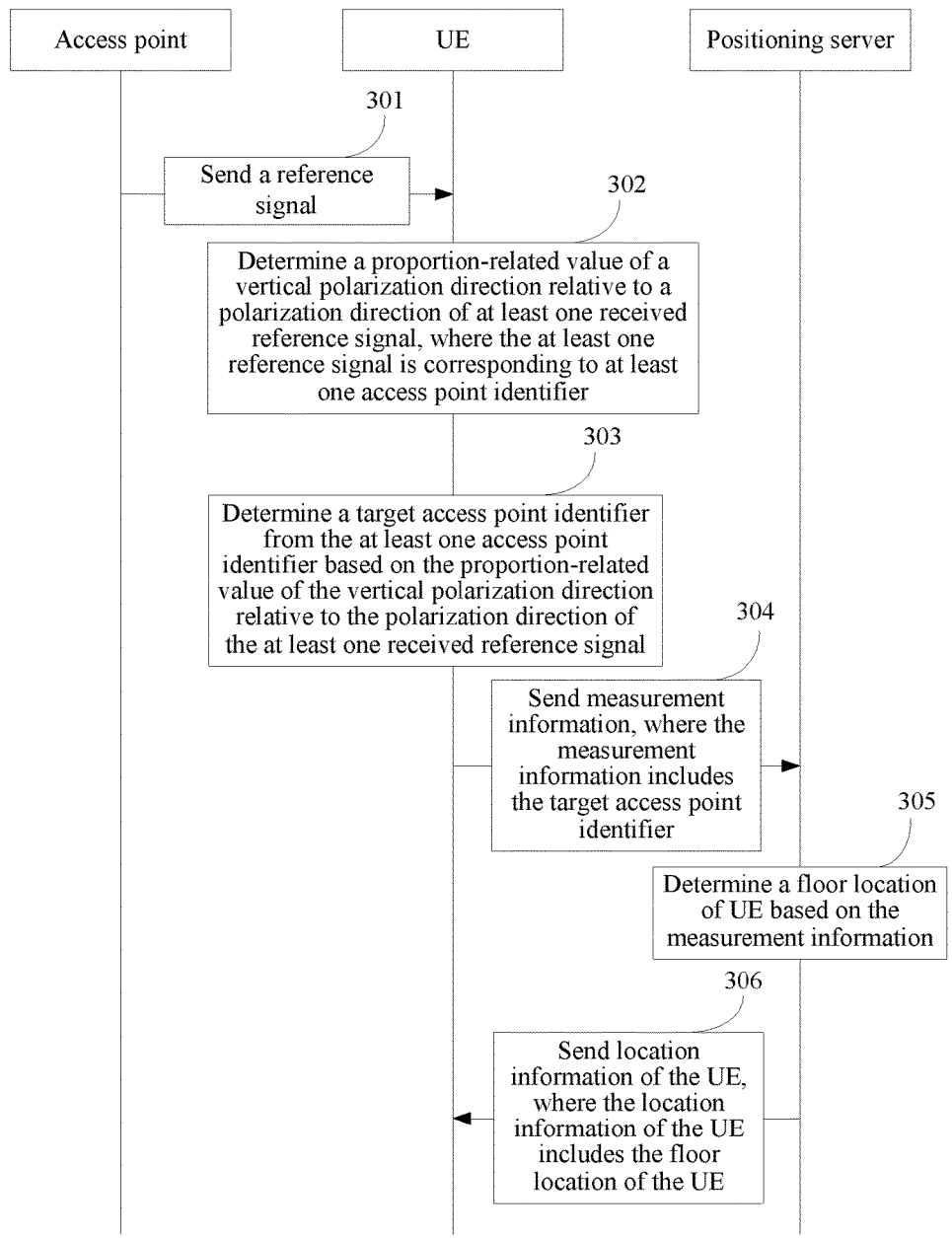
Figure 4:
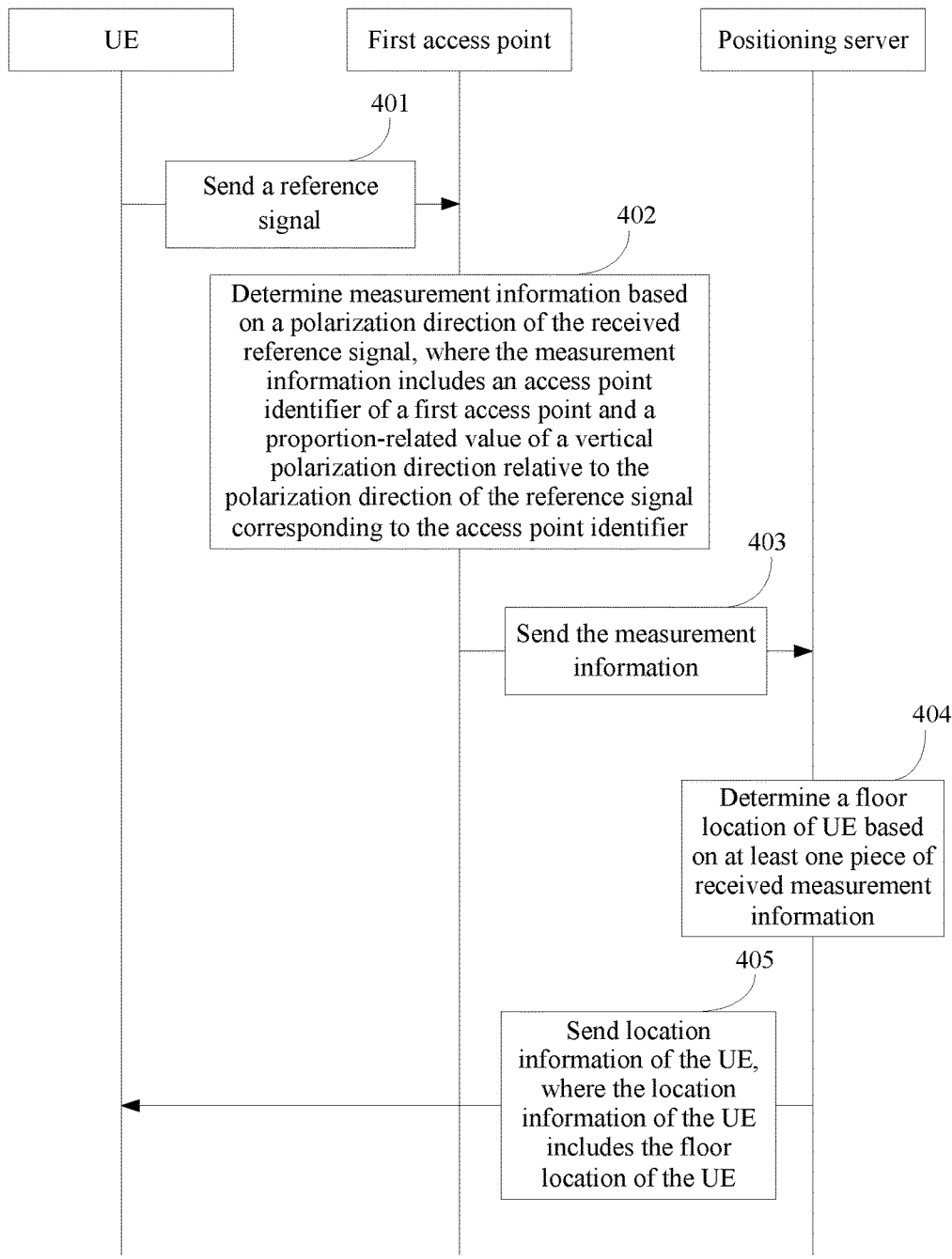

Optionally, as shown in FIG. 2-4, a method for determining a floor location of the UE based on the measurement information may include the following steps.

Step 2041: Determine a target access point identifier from the at least one access point identifier based on the proportion-related value of the vertical polarization direction relative to the polarization direction of the reference signal corresponding to the at least one access point identifier.

In this embodiment of the present disclosure, a target access point is an access point, in an indoor environment (or in a building) in which the UE is located, that is most likely to be on a same floor or at a same height as the UE. For example, a method for determining a target access point identifier from the at least one access point identifier based on the proportion-related value of the vertical polarization direction relative to the polarization direction of the reference signal corresponding to the at least one access point identifier may include the following two manners.

A first manner: The positioning server uses an access point identifier, in the at least one access point identifier, corresponding to a largest proportion-related value of a vertical polarization direction as the target access point identifier.

Optionally, the positioning server may record, based on the measurement information, the proportion-related value of the vertical polarization direction relative to the polarization direction of the reference signal corresponding to the at least one access point identifier, select the largest proportion-related value, and use the access point identifier corresponding to the largest proportion-related value as the target access point identifier. The positioning server may alternatively sort, based on the proportion-related value of the vertical polarization direction relative to the polarization direction of the reference signal, the reference signal corresponding to the at least one access point identifier recorded in the measurement information, determine the largest proportion-related value based on a sorting result, and use the access point identifier corresponding to the largest proportion-related value as the target access point identifier. For example, when sorting is performed in descending order, an access point identifier corresponding to a proportion-related value ranking first may be used as the target access point identifier. For example, in the floor positioning scenario shown in FIG. 2-3, assuming that proportion-related values of vertical polarization directions relative to polarization directions of the reference signals sent by the access points 1 to 3 are 0.8, 0.2, and 0.5, respectively, a largest proportion-related value is 0.8. The proportion-related value 0.8 is a proportion-related value of a vertical polarization direction of a reference signal sent by the access point 1, and in this case, the positioning server may obtain an access point identifier of the access point 1 corresponding to the proportion-related value 0.8, and use the obtained access point identifier as the target access point identifier.

A second manner: The measurement information may further include a measurement value of a preset measurement parameter of the reference signal corresponding to the at least one access point identifier, where the preset measurement parameter includes at least one of an RSRP, a TOA, and an angle of arrival (AOA). The positioning server may obtain a measurement value of a preset measurement parameter corresponding to each of the at least one access point identifier; obtain, through sorting based on the measurement value, a first priority corresponding to each access point identifier; obtain, through sorting based on the proportion-related value of the vertical polarization direction, a second priority corresponding to each access point identifier; obtain a weighted average value of the first priority corresponding to each access point identifier and the second priority corresponding to each access point identifier, to obtain a target priority of each access point identifier; and use, as the target access point identifier, an access point identifier with a highest target priority in the at least one access point identifier. The sorting manner may be a manner in which sorting is performed in ascending order or in descending order, and may be preset depending on an actual case.

In this embodiment of the present disclosure, a weight used for calculating the weighted average value is preset. It is assumed that a weighted averaging formula is $E=r1*K1+r2*K2+r3*K3+g*H$ and $r1+r2+r3+g=1$. K1 represents a first priority, corresponding to each access point identifier, obtained through sorting based on RSRP measurement values; r1 represents a weight of K1; K2 represents a first priority, corresponding to each access point identifier, obtained through sorting based on TOA measurement values; r2 represents a weight of K2; K3 represents a first priority, corresponding to each access point identifier, obtained through sorting based on AOA measurement values; r3 represents a weight of K3, and "*" represents multiplication; H represents a second priority, corresponding to each access point identifier, obtained through sorting based on a proportion-related value of a vertical polarization direction; and g represents a weight of H. When measurement information does not include an RSRP, a TOA, or an AOA, a weight of a first priority corresponding to a parameter that is not included in the measurement information is 0. For example, when the measurement information includes only a TOA, r1 and r3 are 0, and $E=r2*K2+g*H$ and $r2+g=1$. It should be noted that, the weighted averaging formula is merely an example for description in this embodiment of the present disclosure, and a weighted average value obtained through calculation based on another weighted averaging formula shall also fall within the protection scope of the embodiments of the present disclosure.

In this embodiment of the present disclosure, correspondences, obtained through all the sorting, between a priority and a sequence number value are consistent. For example, if the first priority, corresponding to each access point identifier, obtained through sorting based on the measurement value of the preset measurement parameter is positively correlated with a sequence number value, the second priority, corresponding to each access point identifier, obtained through sorting based on the proportion-related value of the vertical polarization direction is positively correlated with a sequence number value, and the target priority of each access point identifier is positively correlated with a sequence number value. If the first priority, corresponding to each access point identifier, obtained through sorting based on the measurement value of the preset measurement parameter is negatively correlated with a sequence number value, the second priority, corresponding to each access point identifier, obtained through sorting based on the proportion-related value of the vertical polarization direction is negatively correlated with a sequence number value, and the target priority of each access point identifier is negatively correlated with a sequence number value. For example, assuming that the preset measurement parameter includes a TOA, the following equations hold true: $E=r2*K2+g*H$ and $r2+g=1$; and it is assumed that $r2=30\%$ and $g=70\%$. In the floor positioning scenario shown in FIG. 2-3, TOAs of the reference signals sent by the access points 1 to 3 are 2 s (second), is, and 1.5 s, respectively. Access point identifiers corresponding to the reference signals sent by the access points 1 to 3 may be sorted in ascending order of the TOA measurement values, as listed in Table 1. A sorting sequence of the access point identifiers is: an access point identifier of the access point 2, an access point identifier of the access point 3, and an access point identifier of the access point 1. Because a higher rank indicates a higher first priority, in this embodiment, a smaller sequence number value in Table 1 indicates a higher first priority. Proportion-related values of vertical polarization directions relative to polarization directions corresponding to the access point identifiers of the access points 1 to 3 are 0.8, 0.2, and 0.5, respectively. The access point identifiers of the access points 1 to 3 may be sorted in descending order of the proportion-related values of the vertical polarization directions, as listed in Table 2. A sorting sequence of the access point identifiers is: the access point identifier of the access point 1, the access point identifier of the access point 3, and the access point identifier of the access point 2. Because a higher rank indicates a higher second priority, in this embodiment, a smaller sequence number value in Table 2 indicates a higher second priority. It is assumed that a first priority is represented by a corresponding sequence number value, a second priority is represented by a corresponding sequence number value, and the priority is negatively correlated with the sequence number value. In this case, for the access point identifier of the access point 1, a sequence number value corresponding to a first priority is 3, a sequence number value corresponding to a second priority is 1, and a sequence number value, corresponding to a target priority of the access point identifier of the access point 1, obtained through calculation based on the weighted averaging formula is $30\%*3+70\%*1=1.6$. Correspondingly, for the access point identifier of the access point 2, a sequence number value corresponding to a first priority is 1, and a sequence number value corresponding to a second priority is 3, and a sequence number value, corresponding to a target priority of the access point identifier of the access point 2, obtained through calculation based on the weighted average value formula is $30\%*1+70\%*3=2.4$. For the access point identifier of the access point 3, a sequence number value corresponding to a first priority is 2, and a sequence number value corresponding to a second priority is 2, and a sequence number value, corresponding to a target priority of the access point identifier of the access point 3, obtained through calculation based on the weighted average value formula is $30\%*2+70\%*2=2$. Because the sequence number value corresponding to the target priority of the access point identifier of the access point 1 is the smallest, and correspondingly the target priority of the access point identifier of the access point 1 is the highest, the access point identifier of the access point 1 is used as the target access point identifier.

TABLE 1

| TOA sorting | TOA measurement value | Access point |
|---|---|---|
| 1 | 3 | Access point 2 |
| 2 | 5 | Access point 3 |
| 3 | 10 | Access point 1 |

TABLE 2

| Sorting of proportion-related values of vertical polarization directions | Proportion-related value of a vertical polarization direction | Access point sending a reference signal |
|---|---|---|
| 1 | 0.8 | Access point 1 |
| 2 | 0.5 | Access point 3 |
| 3 | 0.2 | Access point 2 |

Step 2042: Query a preset correspondence between an access point identifier and a floor based on the target access point identifier.

It should be noted that, the correspondence between an access point identifier and a floor may be configured in the positioning server during deployment of a floor positioning system. As listed in Table 3, in the floor positioning scenario shown in FIG. 2-3, it is assumed that the access point identifier of the access point 1 is the target access point identifier, and the target access point identifier is 003. The correspondence between an access point identifier and a floor listed in Table 3 is queried, to determine that a floor corresponding to the target access point identifier 003 is a third floor. Therefore, the floor location of the UE is the third floor.

TABLE 3

| Access point identifier | Floor |
| --- | --- |
| 001 | 1 |
| 002 | 2 |
| 003 | 3 |
| 004 | 4 |
| 005 | 5 |

Step 2043: Determine a floor corresponding to the target access point identifier as the floor location of the UE.

It should be noted that, in step 2041, if the positioning server determines, based on the measurement information, that there are at least two target access point identifiers, that is, proportion-related values of vertical polarization directions relative to polarization directions of reference signals corresponding to the at least two access point identifiers are the same, the positioning server needs to determine the floor location of the UE based on the at least two target access point identifiers.

For example, the positioning server may separately query floors corresponding to the at least two target access point identifiers, and determine the floor location of the UE according to a preset screening algorithm. For example, the preset screening algorithm may be: A floor corresponding to a largest quantity of target access point identifiers is determined as the floor location of the UE; weighted averaging is performed on floor numbers of the floors corresponding to the at least two target access point identifiers, and a weighted average value is rounded off to serve as a floor number of the floor on which the UE is located; a highest floor in the floors corresponding to the at least two target access point identifiers is determined as the floor location of the UE; or a lowest floor in the floors corresponding to the at least two target access point identifiers is determined as the floor location of the UE. The preset screening algorithms may be selected or combined based on a specific case, and are merely used as examples for description in this embodiment of the present disclosure.

Step 205: The positioning server sends location information of the UE to the UE, where the location information of the UE includes the floor location of the UE.

After the UE receives the location information of the UE sent by the positioning server, because the location information of the UE includes the floor location of the UE, the UE may prompt a user with the floor location of the UE, so that the user knows the current floor location. It should be noted that, the location information of the UE may further include a horizontal location of the UE. For a method for determining the horizontal location, reference may be made to a related technology. Details are not described in this embodiment of the present disclosure.

In this embodiment of the present disclosure, the UE can receive the reference signal sent by the at least one access point in the indoor environment in which the UE is located, determine the measurement information based on the polarization direction of the at least one received reference signal, and send the measurement information to the positioning server; and correspondingly, the positioning server can determine the floor location of the UE based on the measurement information. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

According to a second aspect, the present disclosure provides a floor positioning method. As shown in FIG. 3, the method includes:

Step 301: UE receives a reference signal sent by at least one access point in an indoor environment in which the UE is located.

For a specific description of step 301, reference may be made to step 201. Details are not described in this embodiment of the present disclosure again.

Step 302. The UE determines a proportion-related value of a vertical polarization direction relative to a polarization direction of the at least one received reference signal, where the at least one reference signal is corresponding to at least one access point identifier.

In this embodiment of the present disclosure, the at least one reference signal is in one-to-one correspondence with the at least one access point identifier. A method for determining, by the UE, a proportion-related value of a vertical polarization direction relative to a polarization direction of the at least one received reference signal, reference may be made to the three implementable manners in step 202. Details are not described in this embodiment of the present disclosure again.

Step 303: The UE determines a target access point identifier from the at least one access point identifier based on the proportion-related value of the vertical polarization direction relative to the polarization direction of the at least one received reference signal.

Optionally, the determining, by the UE, a target access point identifier from the at least one access point identifier based on the proportion-related value of the vertical polarization direction relative to the polarization direction of the at least one received reference signal may include the following two manners.

A first manner: The UE uses an access point identifier, in the at least one access point identifier, corresponding to a reference signal with a largest proportion-related value of a vertical polarization direction as the target access point identifier.

Optionally, the UE may directly select, from the at least one received reference signal, the reference signal with the largest proportion-related value of the vertical polarization direction, and use the access point identifier corresponding to the reference signal with the largest proportion-related value as the target access point identifier. Optionally, the UE may alternatively sort the at least one received reference signal based on the proportion-related value of the vertical polarization direction, determine the reference signal with the largest proportion-related value based on a sorting result, and use the access point identifier corresponding to the reference signal with the largest proportion-related value as the target access point identifier. For example, when sorting is performed in descending order, a reference signal ranking first is determined as the reference signal with the largest proportion-related value. For example, in the floor positioning scenario shown in FIG. 2-3, assuming that proportion-related values of vertical polarization directions relative to polarization directions of the reference signals sent by the access points 1 to 3 are 0.8, 0.2, and 0.5, respectively, a reference signal with a largest proportion-related value is sent by the access point 1. The UE may obtain an access point identifier, of the access point 1, corresponding to the reference signal sent by the access point 1, and use the obtained access point identifier as the target access point identifier.

A second manner: The UE obtains a measurement value of a preset measurement parameter of the reference signal corresponding to the at least one access point identifier, where the preset measurement parameter includes at least one of an RSRP, a TOA, and an AOA; obtains, through sorting based on the measurement value, a first priority corresponding to each of the at least one received reference signal; obtains, through sorting based on the proportion-related value of the vertical polarization direction, a second priority corresponding to each reference signal; obtains a weighted average value of the first priority corresponding to each reference signal and the second priority corresponding to each reference signal, to obtain a target priority of each reference signal; and uses an access point identifier, in the at least one access point identifier, corresponding to a reference signal with a highest target priority as the target access point identifier. A sorting manner used during the foregoing sorting process may be a manner in which sorting is performed in ascending order or in descending order, and may be preset depending on an actual case.

In this embodiment of the present disclosure, a weight used for calculating the weighted average value is preset. It is assumed that a weighted averaging formula is $E=r1*K1+r2*K2+r3*K3+g*H$ and $r1+r2+r3+g=1$. K1 represents a first priority, corresponding to a first reference signal, obtained through sorting based on RSRP measurement values; r1 represents a weight of K1; K2 represents a first priority, corresponding to the first reference signal, obtained through sorting based on TOA measurement values; r2 represents a weight of K2; K3 represents a first priority, corresponding to the first reference signal, obtained through sorting based on AOA measurement values; r3 represents a weight of K3; H represents a second priority, corresponding to the first reference signal, obtained through sorting based on a proportion-related value of a vertical polarization direction; g represents a weight of H; and the first reference signal is sent by any access point in the indoor environment in which the UE is located. When measurement information does not include an RSRP, a TOA, or an AOA, a weight of a first priority corresponding to a parameter that is not included in the measurement information is 0. For example, when the measurement information includes only a TOA, r1 and r3 are 0, and $E=r2*K2+g*H$ and $r2+g=1$. It should be noted that, the weighted averaging formula is merely an example for description in this embodiment of the present disclosure, and a weighted average value obtained through calculation based on another weighted averaging formula shall also fall within the protection scope of the embodiments of the present disclosure.

In this embodiment of the present disclosure, correspondences, obtained through all the sorting, between a priority and a sequence number value are consistent. For example, if the first priority, corresponding to each reference signal, obtained through sorting based on the measurement value of the preset measurement parameter is positively correlated with a sequence number value, the second priority, corresponding to each reference signal, obtained through sorting based on the proportion-related value of the vertical polarization direction is positively correlated with a sequence number value, and the target priority of each reference signal is positively correlated with a sequence number value. If the first priority, corresponding to each reference signal, obtained through sorting based on the measurement value of the preset measurement parameter is negatively correlated with a sequence number value, the second priority, corresponding to each reference signal, obtained through sorting based on the proportion-related value of the vertical polarization direction is negatively correlated with a sequence number value, and the target priority of each reference signal is negatively correlated with a sequence number value.

For example, assuming that the preset measurement parameter includes an RSRP, the following equations hold true: $E=r1*K1+g*H$ and $r1+g=1$; and it is assumed that $r1=30\%$ and $g=70\%$. In the floor positioning scenario shown in FIG. 2-3, RSRPs of the reference signals sent by the access points 1 to 3 are 100 dB (decibel), 130 dB, and 110 dB, respectively. The reference signals sent by the access points 1 to 3 may be sorted in descending order of the RSRP measurement values, as listed in Table 4. A sorting sequence of the reference signals is: a reference signal sent by the access point 2, a reference signal sent by the access point 3, and a reference signal sent by the access point 1. Because a higher rank indicates a higher first priority, in this embodiment, a smaller sequence number value in Table 4 indicates a higher first priority. For example, proportion-related values, determined according to the first implementable manner of determining, by the UE, the proportion-related value of the vertical polarization direction relative to the polarization direction of the reference signal, of vertical polarization directions relative to polarization directions of the reference signals sent by the access points 1 to 3 are 0.8, 0.2, and 0.5, respectively. The reference signals sent by the access points 1 to 3 may be sorted in descending order of the proportion-related values of the vertical polarization directions, as listed in Table 2. A sorting sequence of the reference signals is: the reference signal sent by the access point 1, the reference signal sent by the access point 3, and the reference signal sent by the access point 2. Because a higher rank indicates a higher second priority, in this embodiment, a smaller sequence number value in Table 2 indicates a higher second priority. It is assumed that a first priority is represented by a corresponding sequence number value, a second priority is represented by a corresponding sequence number value, and the priority is negatively correlated with the sequence number value. In this case, for the reference signal sent by the access point 1, a sequence number value corresponding to a first priority is 3, a sequence number value corresponding to a second priority is 1, and a sequence number value, corresponding to a target priority of the reference signal sent by the access point 1, obtained through calculation based on the weighted average value formula is $30\%*3+70\%*1=1.6$. Correspondingly, for the reference signal sent by the access point 2, a sequence number value corresponding to a first priority is 1, and a sequence number value corresponding to a second priority is 3, and a sequence number value, corresponding to a target priority of the reference signal sent by the access point 2, obtained through calculation based on the weighted average value formula is $30\%*1+70\%*3=2.4$. For the reference signal sent by the access point 3, a sequence number value corresponding to a first priority is 2, and a sequence number value corresponding to a second priority is 2, and a sequence number value, corresponding to a target priority of the reference signal sent by the access point 3, obtained through calculation based on the weighted average value formula is $30\%*2+70\%*2=2$. Because the sequence number value corresponding to the target priority of the reference signal sent by the access point 1 is the smallest, and correspondingly the target priority of the reference signal sent by the access point 1 is the highest, the access point identifier of the access point 1 is used as the target access point identifier.

TABLE 4

| RSRP sorting | RSRP measurement value | Access point sending a reference signal |
| --- | --- | --- |
| 1 | 130 | Access point 2 |
| 2 | 110 | Access point 3 |
| 3 | 100 | Access point 1 |

In actual application, a first priority may be represented by a corresponding sequence number value, a second priority may be represented by a corresponding sequence number value, and the priority is positively correlated with the sequence number value. In other words, a larger sequence number value indicates a higher priority, and a larger sequence number value, corresponding to a target priority, obtained based on the weighted averaging formula indicates a higher priority. Therefore, a reference signal corresponding to a highest target priority is used as a target reference signal.

It should be noted that, the determining, by the UE, a target access point identifier from the at least one access point identifier based on the proportion-related value of the vertical polarization direction relative to the polarization direction of the at least one received reference signal may include other manners. For example, when the UE uses the first implementable manner or the second implementable manner in step 202 to determine the proportion-related value of the vertical polarization direction relative to the polarization direction of the at least one received reference signal, a proportion-related value of a vertical polarization direction relative to a polarization direction of each reference signal is 0 or 1. The UE may select, from the obtained reference signal, a reference signal whose proportion-related value of a vertical polarization direction relative to a polarization direction is 1, and obtain a measurement value of a preset measurement parameter of the selected reference signal, where the preset measurement parameter includes at least one of an RSRP, a TOA, and an AOA. The UE sorts the selected reference signal based on the measurement value; obtains, based on a sorting result, a priority corresponding to the selected reference signal; and uses an access point identifier corresponding to a reference signal with a highest priority in the selected reference signal as the target access point identifier.

Alternatively, the UE may first obtain a measurement value of a preset measurement parameter of a received reference signal, where the measurement value includes at least one of an RSRP, a TOA, and an AOA; obtain, through sorting based on the measurement value, a first priority corresponding to each reference signal; obtain a product of the first priority corresponding to each reference signal and a proportion-related value of a vertical polarization direction of the reference signal; and use, as the target access point identifier, an access point identifier corresponding to a reference signal corresponding to a product ranking first.

Alternatively, the UE may first obtain a measurement value of a preset measurement parameter of a received reference signal, where the measurement value includes at least one of an RSRP, a TOA, and an AOA; obtain, through sorting based on the measurement value, a first priority corresponding to each reference signal; and use, as the target access point identifier, an access point identifier corresponding to a reference signal with a highest first priority in the at least one reference signal whose proportion-related value is 1.

For example, in the floor positioning scenario shown in FIG. 2-3, it is assumed that the reference signals sent by the access points 1 to 3 may be sorted in descending order of the RSRP measurement values, as listed in Table 4. The proportion-related values of the vertical polarization directions relative to the polarization directions of the reference signals sent by the access points 1 to 3 are 1, 0, and 0, respectively. A reference signal with a highest first priority in a reference signal whose proportion-related value is 1 is the reference signal sent by the access point 1; or it may be determined, by using a method for obtaining a product of the first priority corresponding to each reference signal and the proportion-related value of the vertical polarization direction of the reference signal, that a reference signal corresponding to a product ranking first is the reference signal sent by the access point 1. Therefore, the access point identifier of the access point 1 is the target access point identifier.

It should be noted that, for a method for obtaining, through sorting based on the measurement value, the first priority corresponding to each of the at least one received reference signal in this embodiment of the present disclosure, reference may be made to a related technology. For example, the first priority corresponding to each of the at least one received reference signal is obtained through sorting in ascending order or in descending order based on the measurement value. However, in this embodiment of the present disclosure, a sorting manner of the measurement value is the same as that of the proportion-related value of the vertical polarization direction, so as to ensure effective weighted average value calculation.

Step 304: The UE sends measurement information to a positioning server, where the measurement information includes the target access point identifier.

For example, the UE may send the measurement information to the positioning server by using a wireless connection established between the UE and the positioning server.

Step 305: The positioning server determines a floor location of the UE based on the measurement information.

Because the measurement information includes the target access point identifier, the determining, by the positioning server, a floor location of the UE based on the measurement information may include: querying for a preset correspondence between an access point identifier and a floor based on the target access point identifier; and determining a floor corresponding to the target access point identifier as the floor location of the UE. For a specific process, reference may be made to steps 2042 and 2043 in the foregoing embodiment. Details are not described in this embodiment of the present disclosure again.

Step 306: The positioning server sends location information of the UE to the UE, where the location information of the UE includes the floor location of the UE.

After the UE receives the location information of the UE sent by the positioning server, because the location information of the UE includes the floor location of the UE, the UE may prompt a user with the floor location of the UE, so that the user knows the current floor location.

In this embodiment of the present disclosure, the UE can receive the reference signal sent by the at least one access point in the indoor environment in which the UE is located, determine the measurement information based on the polarization direction of the at least one received reference signal, and send the measurement information to the positioning server; and correspondingly, the positioning server can determine the floor location of the UE based on the measurement information. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

In the other aspect, to determine the floor location of the UE by determining a spatial topology structure of an access point based on a reference signal that is sent by the UE in an indoor environment in which the at least one access point is located and that is received by the at least one access point, the present disclosure provides a floor positioning method. Because there may be a plurality of access points in the indoor environment in which the UE is located, a first access point in the indoor environment in which the UE is located is used as an example in this embodiment of the present disclosure. For operations of another access point, reference may be made to those of the first access point. As shown in FIG. 4, the method includes the following steps.

Step 401: The UE in the indoor environment in which the first access point is located sends a reference signal to the first access point.

Step 402: The first access point determines measurement information based on a polarization direction of the received reference signal, where the measurement information includes an access point identifier of the first access point and a proportion-related value of a vertical polarization direction relative to the polarization direction of the reference signal corresponding to the access point identifier.

In this embodiment of the present disclosure, a process for determining, by the first access point, measurement information based on a polarization direction of the received reference signal may include the following three manners.

In a first manner, the determining, by the first access point, measurement information based on a polarization direction of the received reference signal may include the following steps.

Step D1: The first access point determines a degree of direction approximation between the polarization direction and a vertical polarization direction of the reference signal.

Step D2: The first access point determines a degree of direction approximation between the polarization direction and a horizontal polarization direction of the reference signal, where the horizontal polarization direction is perpendicular to the vertical polarization direction.

Step D3: The first access point determines whether the degree of direction approximation between the polarization direction and the vertical polarization direction of the reference signal is higher than the degree of direction approximation between the polarization direction and the horizontal polarization direction of the reference signal.

Step D4: When the degree of direction approximation between the polarization direction and the vertical polarization direction of the reference signal is higher than the degree of direction approximation between the polarization direction and the horizontal polarization direction of the reference signal, the first access point determines a proportion-related value of the vertical polarization direction relative to the polarization direction of the reference signal as 1.

Step D5: When the degree of direction approximation between the polarization direction and the vertical polarization direction of the reference signal is not higher than the degree of direction approximation between the polarization direction and the horizontal polarization direction of the reference signal, the first access point determines a proportion-related value of the vertical polarization direction relative to the polarization direction of the reference signal as 0.

For steps D1 to D5 in this embodiment of the present disclosure, reference may be made to steps A1 to A5 of step 202 in the foregoing embodiment. In steps D1 to D5, the first access point receives the reference signal sent by the to-be-positioned UE; in steps A1 to A5, the to-be-positioned UE receives the reference signal sent by the at least one access point. Therefore, for a process for processing the reference signal by the first access point in steps D1 to D5, reference may be made to the process for processing a reference signal (for example, the first reference signal) by the UE in steps A1 to A5. Details are not described in this embodiment of the present disclosure again.

In a second manner, a vertical polarization antenna and a horizontal polarization antenna are disposed in the first access point, and a signal sending/receiving direction of the vertical polarization antenna is perpendicular to that of the horizontal polarization antenna; and the determining, by the first access point, measurement information based on a polarization direction of the received reference signal may include the following steps:

Step E1: The first access point determines a signal strength of the reference signal that is received by the access point by using the vertical polarization antenna.

Step E2: The first access point determines whether the signal strength of the reference signal that is received by using the vertical polarization antenna is greater than a preset vertical polarization signal threshold.

Step E3: When the signal strength of the reference signal that is received by using the vertical polarization antenna is greater than the preset vertical polarization signal threshold, the first access point determines a proportion-related value of a vertical polarization direction relative to the polarization direction of the reference signal as 1.

Step E4: When the signal strength of the reference signal that is received by using the vertical polarization antenna is not greater than the preset vertical polarization signal threshold, the first access point determines a proportion-related value of a vertical polarization direction relative to the polarization direction of the reference signal as 0.

For example, as shown in FIG. 2-3, it is assumed that an indoor environment in which the UE is located is a building having six floors. After entering the indoor environment, the UE sends reference signals respectively to access points 1 to 3 disposed on ceilings of a third floor to a fifth floor. Strengths of the reference signals that are sent by the UE and that are received by the access points 1 to 3 by using the vertical polarization antenna are 10 v/m (volt/meter), 3 v/m, and 5 v/m, respectively. It is assumed that a preset vertical polarization signal threshold is 8 v/m. The access points 1 to 3 compare 8 v/m with each of the strengths of the reference signals received by the access points 1 to 3: 10 v/m, 3 v/m, and 5 v/m; when a strength of a received reference signal is greater than 8 v/m, determines, as 1, a proportion-related value of a vertical polarization direction relative to a polarization direction of the received reference signal; and when a strength of a received reference signal is less than or equal to 8 v/m, determines, as 0, a proportion-related value of a vertical polarization direction relative to a polarization direction of the received reference signal. For example, assuming that the first access point is the access point 1 and the first access point determines that a strength of the reference signal received by the first access point, that is, 10 v/m, is greater than 8 v/m, a proportion-related value of a vertical polarization direction relative to a polarization direction of the reference signal received by the first access point is determined as 1.

In actual application, the first access point may receive reference signals sent by a plurality of UEs, but strengths of some reference signals are relatively weak due to a relatively long distance from the UEs or block of some obstacles. In this case, the first access point may ignore a reference signal whose reference signal strength is less than the preset strength threshold, and process only a reference signal whose reference signal strength is greater than or equal to the preset strength threshold. For example, it is assumed that the first access point is located on the third floor, UE 1 located on the third floor and UE 2 located on a sixth floor are in the building, the first access point receives reference signals sent by the UE 1 and the UE 2, and each reference signal carries a corresponding UE identifier. However, because the UE 2 located on the sixth floor is relatively far from the first access point, the reference signal sent by the UE 2 is relatively weak. Assuming that a signal strength of the reference signal that carries a UE identifier of the UE 2 and that is received by the first access point is less than the preset strength threshold, the first access point ignores the received reference signal sent by the UE 2, and processes only the received reference signal sent by the UE 1. In this way, a process for processing an unwanted signal can be avoided, and load of the first access point is reduced.

For steps E1 to E4 in this embodiment of the present disclosure, reference may be made to steps B1 to B4 of step 202 in the foregoing embodiment. In steps E1 to E4, the first access point receives the reference signal sent by the to-be-positioned UE; in steps B1 to B4, the to-be-positioned UE receives the reference signal sent by the at least one access point. Therefore, for a process for processing the reference signal by the first access point in steps E1 to E4, reference may be made to the process for processing a reference signal (for example, the first reference signal) by the UE in steps B1 to B4. Details are not described in this embodiment of the present disclosure again.

In a third manner, a vertical polarization antenna and a horizontal polarization antenna are disposed in the access point, and a signal sending/receiving direction of the vertical polarization antenna is perpendicular to that of the horizontal polarization antenna; and the determining, by the first access point, measurement information based on a polarization direction of the received reference signal may include the following steps:

Step F1: The first access point determines a signal strength of the reference signal that is received by the access point by using the vertical polarization antenna.

Step F2: The first access point determines a signal strength of the reference signal that is received by the access point by using the horizontal polarization antenna.

Step F3: The first access point determines a proportion-related value X of a vertical polarization direction relative to the polarization direction of the reference signal according to a proportion-related value formula, where the proportion-related value formula is:

$$X = \arctan(M/N), \text{ where}$$

M is the signal strength of the reference signal that is received by the access point by using the vertical polarization antenna, and N is the signal strength of the reference signal that is received by the access point by using the horizontal polarization antenna.

For example, as shown in FIG. 2-3, it is assumed that the first access point is the access point 1, a strength of a reference signal that is sent by the UE and that is received by the access point 1 by using the vertical polarization antenna is 10 v/m, and a strength of a reference signal that is sent by the UE and that is received by the access point 1 by using the horizontal polarization antenna is 1 v/m. In this case, a proportion-related value of a vertical polarization direction relative to a polarization direction of the reference signal received by the access point 1 is arctan(10/1)=arctan 10.

For steps F1 to F3 in this embodiment of the present disclosure, reference may be made to steps C1 to C3 of step 202 in the foregoing embodiment. In steps F1 to F3, the first access point receives the reference signal sent by the to-be-positioned UE; in steps C1 to C3, the to-be-positioned UE receives the reference signal sent by the at least one access point. Therefore, for a process for processing the reference signal by the first access point in steps F1 to F3, reference may be made to the process for processing a reference signal (for example, the first reference signal) by the UE in steps C1 to C3. Details are not described in this embodiment of the present disclosure again.

Step 403: The first access point sends the measurement information to a positioning server.

Step 404: The positioning server determines a floor location of the UE based on at least one piece of received measurement information.

The positioning server receives the measurement information sent by at least one access point, where the at least one piece of received measurement information is determined, after the at least one access point receives a reference signal sent by the UE in the indoor environment in which the at least one access point is located, based on a polarization direction of the received reference signal, and each piece of measurement information includes an access point identifier and a proportion-related value of a vertical polarization direction relative to the polarization direction of the reference signal corresponding to the access point identifier. The access point identifier is corresponding to the proportion-related value.

The positioning server may receive measurement information sent by a plurality of access points, each piece of measurement information may carry an access point identifier for identifying each access point, and a reference signal received by each access point may be from a plurality of UEs. Therefore, before sending the reference signal, the UE needs to send UE positioning assistance information, where the UE positioning assistance information carries a UE identifier and other related information. The first access point receives, based on the UE positioning assistance information, the reference signal sent by the corresponding UE, and can establish a correspondence between a reference signal and a UE identifier after receiving the reference signal. Therefore, the first access point can finally determine, based on the at least one piece of received reference signal, a UE identifier corresponding to the at least one reference signal, to obtain at least one UE identifier; and generate measurement information based on the at least one UE identifier and a proportion-related value that is of a vertical polarization direction relative to a polarization direction of the reference signal corresponding to the at least one UE identifier. Therefore, each piece of measurement information may also carry the UE identifier. This helps the positioning server to determine to-be-positioned UE and send positioning information to the UE. After receiving the measurement information sent by the at least one access point in the indoor environment in which the UE is located, the positioning server needs to determine, based on a UE identifier carried in the at least one piece of measurement information, measurement information corresponding to different UEs, and process measurement information of same UE to obtain a floor on which the UE is located.

For example, as listed in Table 5, the positioning server receives four pieces of measurement information sent by the access point 1 and the access point 2: information 1 to information 4, respectively, and UE identifiers carried in the information 1 to the information 4 are 1, 1, 2, and 2, respectively. In this case, correspondingly, the information 1 and information 2 are measurement information corresponding to UE 1, and are used to position the UE 1; the information 3 and the information 4 are measurement information corresponding to UE 2, and are used to position the UE 2.

TABLE 5

| Access point | Measurement information | UE identifier carried in measurement information | Corresponding UE |
|---|---|---|---|
| 1 | Information 1 | 1 | UE 1 |
| 2 | Information 2 | 1 | |
| 1 | Information 3 | 2 | UE 2 |
| 2 | Information 4 | 2 | |

In this embodiment of the present disclosure, that there is one to-be-positioned UE and the at least one piece of measurement information received by the positioning server is measurement information of the same UE is used as an example for description. When there are a plurality of to-be-positioned UEs, for a processing process for each UE, reference may be made to a processing process for the UE.

Optionally, a method for determining, by the positioning server, a floor location of the UE based on the at least one piece of received measurement information may include: determining a target access point identifier based on the proportion-related value of the vertical polarization direction relative to the polarization direction of the reference signal corresponding to the access point identifier in the at least one piece of received measurement information; querying for a preset correspondence between an access point identifier and a floor based on the target access point identifier; and determining a floor corresponding to the target access point identifier as the floor location of the UE.

For a specific process for querying, by the positioning server, for a preset correspondence between an access point identifier and a floor based on the target access point identifier, and determining a floor corresponding to the target access point identifier as the floor location of the UE, reference may be made to steps 2042 and 2043 in the foregoing embodiment. Details are not described in this embodiment of the present disclosure again.

For example, a method for determining a target access point identifier based on the proportion-related value of the vertical polarization direction relative to the polarization direction of the reference signal corresponding to the access point identifier in the at least one piece of received measurement information may include the following two manners.

A first manner: The positioning server uses an access point identifier, in the at least one piece of received measurement information, corresponding to a largest proportion-related value of a vertical polarization direction as the target access point identifier.

Optionally, the positioning server may directly select, in the at least one piece of received measurement information, the largest proportion-related value of the vertical polarization direction, and use the access point identifier corresponding to a reference signal with the largest proportion-related value as the target access point identifier. The positioning server may alternatively sort the at least one piece of measurement information based on the proportion-related value; determine the largest proportion-related value based on a sorting result; and use the access point identifier corresponding to the largest proportion-related value as the target access point identifier. For example, when sorting is performed in descending order, an access point identifier corresponding to a proportion-related value ranking first may be used as the target access point identifier. For example, in the floor positioning scenario shown in FIG. 2-3, it is assumed that proportion-related value of vertical polarization directions relative to polarization directions of the reference signals received by the access points 1 to 3 are 0.8, 0.2, and 0.5, respectively, and proportion-related values, carried in measurement information (three pieces of measurement information in total) respectively sent by the access points 1 to 3, of vertical polarization directions relative to polarization directions of the reference signals are 0.8, 0.2, and 0.5, respectively. In this case, a reference signal with a largest proportion-related value of a vertical polarization direction is received by the access point 1, that is, the proportion-related value of the vertical polarization direction of the reference signal corresponding to an access point identifier of the access point 1 is the largest. The positioning server may obtain the access point identifier of the access point 1, and use the obtained access point identifier as the target access point identifier.

A second manner: Each piece of measurement information further includes a measurement value of a preset measurement parameter of a reference signal corresponding to an access point identifier, where the preset measurement parameter includes at least one of an RSRP, a TOA, and an AOA. The positioning server may obtain a measurement value of a preset measurement parameter corresponding to each access point identifier in the at least one piece of received measurement information; obtain, through sorting based on the measurement value, a first priority corresponding to each access point identifier; obtain, through sorting based on the proportion-related value of the vertical polarization direction, a second priority corresponding to each access point identifier; obtain a weighted average value of the first priority corresponding to each access point identifier and the second priority corresponding to each access point identifier, to obtain a target priority of each access point identifier; and use an access point identifier with a highest target priority as the target access point identifier.

In this embodiment of the present disclosure, a weight used for calculating the weighted average value is preset. It is assumed that a weighted averaging formula is $E=r1*K1+r2*K2+r3*K3+g*H$ and $r1+r2+r3+g=1$. K1 represents a first priority, corresponding to each access point identifier, obtained through sorting based on RSRP measurement values; r1 represents a weight of K1; K2 represents a first priority, corresponding to each access point identifier, obtained through sorting based on TOA measurement values; r2 represents a weight of K2; K3 represents a first priority, corresponding to each access point identifier, obtained through sorting based on AOA measurement values; r3 represents a weight of K3; H represents a second priority, corresponding to each access point identifier, obtained through sorting based on a proportion-related value of a vertical polarization direction; g represents a weight of H; and each access point identifier is sent by any access point in the indoor environment in which the UE is located. When the measurement information does not include an RSRP, a TOA, or an AOA, a weight of a first priority corresponding to a parameter that is not included in the measurement information is 0. For example, when the measurement information includes only a TOA, r1 and r3 are 0, and E=r2*K2+g*H and r2+g=1. It should be noted that, the weighted averaging formula is merely an example for description in this embodiment of the present disclosure, and a weighted average value obtained through calculation based on another weighted averaging formula shall also fall within the protection scope of the embodiments of the present disclosure.

In this embodiment of the present disclosure, correspondences, obtained through all the sorting, between a priority and a sequence number value are consistent. For example, if the first priority, corresponding to each access point identifier, obtained through sorting based on the measurement value of the preset measurement parameter is positively correlated with a sequence number value, the second priority, corresponding to each access point identifier, obtained through sorting based on the proportion-related value of the vertical polarization direction is positively correlated with a sequence number value, and the target priority of each access point identifier is positively correlated with a sequence number value. If the first priority, corresponding to each access point identifier, obtained through sorting based on the measurement value of the preset measurement parameter is negatively correlated with a sequence number value, the second priority, corresponding to each access point identifier, obtained through sorting based on the proportion-related value of the vertical polarization direction is negatively correlated with a sequence number value, and the target priority of each access point identifier is negatively correlated with a sequence number value. For example, assuming that the preset measurement parameter includes an AOA, the following equations hold true: E=r3*K3+g*H and r3+g=1; and it is assumed that r3=30% and g=70%. In the floor positioning scenario shown in FIG. 2-3, AOAs corresponding to access point identifiers of the access points 1 to 3 are 30°, 90°, and 70°, respectively. The access point identifiers of the access points 1 to 3 may be sorted in ascending order of the AOA measurement values, as listed in Table 6. A sorting sequence of the access point identifiers is: an access point identifier of the access point 1, an access point identifier of the access point 3, and an access point identifier of the access point 2. Because a higher rank indicates a higher first priority, in this embodiment, a smaller sequence number value in Table 6 indicates a higher first priority. For example, proportion-related values, determined according to the third implementable manner of determining, by the first access point, the proportion-related value of the vertical polarization direction relative to the polarization direction of the reference signal corresponding to the access point identifier, of vertical polarization directions relative to polarization directions of the reference signals corresponding to access point identifiers of the access points 1 to 3 are 1, 0, and 0, respectively. The access point identifiers of the access points 1 to 3 may be sorted in descending order of the proportion-related values of the vertical polarization directions, as listed in Table 2. A sorting sequence of the access point identifiers is: the access point identifier of the access point 1, and the access point identifiers of the access point 2 and the access point 3. Because a higher rank indicates a higher second priority, in this embodiment, a smaller sequence number value in Table 7 indicates a higher second priority. It is assumed that a first priority is represented by a corresponding sequence number value, a second priority is represented by a corresponding sequence number value, and the priority is negatively correlated with the sequence number value. In this case, for the access point identifier of the access point 1, a sequence number value corresponding to a first priority is 1, a sequence number value corresponding to a second priority is 1, and a sequence number value, corresponding to a target priority of the access point identifier of the access point 1, obtained through calculation based on the weighted average value formula is 30%*1+70%*1=1. Correspondingly, for the access point identifier of the access point 2, a sequence number value corresponding to a first priority is 3, and a sequence number value corresponding to a second priority is 2, and a sequence number value, corresponding to a target priority of the access point identifier of the access point 2, obtained through calculation based on the weighted average value formula is 30%*3+70%*2=2.3. For the access point identifier of the access point 3, a sequence number value corresponding to a first priority is 2, and a sequence number value corresponding to a second priority is 2, and a sequence number value, corresponding to a target priority of the access point identifier of the access point 3, obtained through calculation based on the weighted average value formula is 30%*2+70%*2=2. Because the sequence number value corresponding to the target priority of the access point identifier of the access point 1 is the smallest, and correspondingly the target priority of the access point identifier of the access point 1 is the highest, the access point identifier of the access point 1 is used as the target access point identifier.

TABLE 6

| AOA sorting | AOA measurement value | Access point |
| --- | --- | --- |
| 1 | 30° | Access point 1 |
| 2 | 70° | Access point 3 |
| 3 | 90° | Access point 2 |

TABLE 7

| Sorting of proportion-related values of vertical polarization directions | Proportion-related value of a vertical polarization direction | Access point |
| --- | --- | --- |
| 1 | 1 | Access point 1 |
| 2 | 0 | Access point 3 |
| 2 | 0 | Access point 2 |

In actual application, a first priority may be represented by a corresponding sequence number value, a second priority may be represented by a corresponding sequence number value, and the priority is positively correlated with the sequence number value. In other words, a larger sequence number value indicates a higher priority, and a larger sequence number value, corresponding to a target priority, obtained based on the weighted averaging formula indicates a higher priority. Therefore, an access point identifier corresponding to a highest target priority is used as the target access point identifier.

It should be noted that, the measurement information generated in step 402 may also include a weighted average value and an access point identifier, where the weighted averaging value is obtained through calculation by the first access point. For example, the first access point determines a proportion-related value of a vertical polarization direction relative to the polarization direction of the reference signal, where the vertical polarization direction is parallel to a gravity direction; obtains a measurement value of a preset measurement parameter of the reference signal, where the preset measurement parameter includes at least one of an RSRP, a TOA, and an AOA; and obtains a weighted average value of the measurement value of the preset measurement parameter of the reference signal and the proportion-related value of the vertical polarization direction. In step 404, a process for determining, by the positioning server, a floor location of the UE based on the at least one piece of received measurement information may include: using an access point identifier corresponding to a largest weighted average value in the at least one piece of received measurement information as a target access point identifier; querying for a preset correspondence between an access point identifier and a floor based on the target access point identifier; and determining a floor corresponding to the target access point identifier as the floor location of the UE.

Step 405: The positioning server sends location information of the UE to the UE, where the location information of the UE includes the floor location of the UE.

After the UE receives the location information of the UE sent by the positioning server, because the location information of the UE includes the floor location of the UE, the UE may prompt a user with the floor location of the UE, so that the user knows the current floor location.

In this embodiment of the present disclosure, the access point can determine the measurement information based on the polarization direction of the received reference signal, and send the measurement information to the positioning server; and correspondingly, the positioning server can determine the floor location of the UE based on the at least one piece of received measurement information. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

It should be noted that an order of the steps of the floor positioning method provided in this embodiment of the present disclosure may be properly adjusted, and a step may alternatively be correspondingly added or deleted depending on a case. All variant methods readily figured out by a person skilled in the art within the technical scope disclosed in the present disclosure shall fall within the protection scope of the present disclosure, and therefore are not described.

In addition, in the foregoing embodiments, for related processes shown in FIG. 2-1 to FIG. 2-4, FIG. 3, and FIG. 4, reference may be made to each other. In actual application, related steps may be combined or replaced. Therefore, any modification, equivalent replacement, and improvement made without departing from the spirit and principle of the present disclosure shall fall within the protection scope of the present disclosure.

Figure 5:
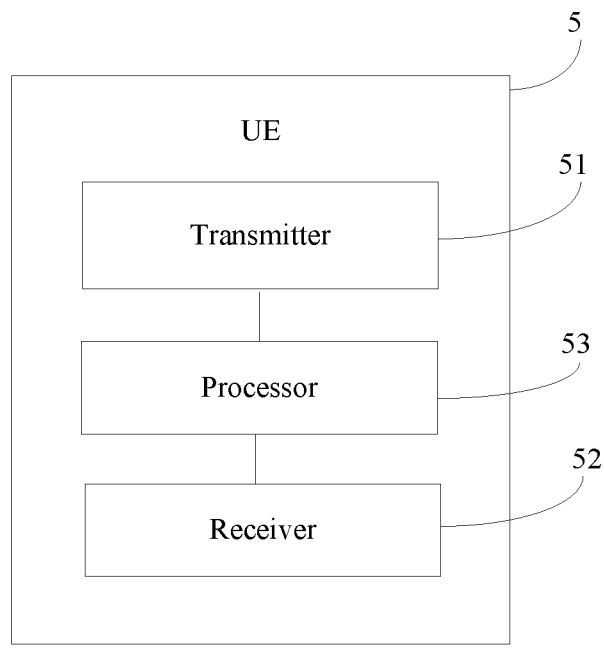
FIG. 5 is a schematic structural diagram of UE according to an example embodiment of the present disclosure.

FIG. 5 is a schematic structural diagram of UE 5 according to another embodiment of the present disclosure. The UE 5 includes a transmitter 51, a receiver 52, and a processor 53, where the receiver 52 is configured to receive a reference signal sent by at least one access point in an indoor environment in which the UE is located;

the processor 53 is configured to determine measurement information based on a polarization direction of the at least one received reference signal, where the measurement information includes at least one access point identifier and a proportion-related value of a vertical polarization direction relative to the polarization direction of the reference signal corresponding to the at least one access point identifier;

the transmitter 51 is configured to send the measurement information to a positioning server; and the receiver 52 is further configured to receive location information of the UE sent by the positioning server, where the location information of the UE includes a floor location of the UE, and the floor location of the UE is determined based on the measurement information.

Optionally, the processor 53 is configured to:

determine a degree of direction approximation between a polarization direction and a vertical polarization direction of a first reference signal, where the first reference signal is sent by one of the at least one access point;

determine a degree of direction approximation between the polarization direction and a horizontal polarization direction of the first reference signal, where the horizontal polarization direction is perpendicular to the vertical polarization direction;

determine whether the degree of direction approximation between the polarization direction and the vertical polarization direction of the first reference signal is higher than the degree of direction approximation between the polarization direction and the horizontal polarization direction of the first reference signal; and when the degree of direction approximation between the polarization direction and the vertical polarization direction of the first reference signal is higher than the degree of direction approximation between the polarization direction and the horizontal polarization direction of the first reference signal, determine a proportion-related value of the vertical polarization direction relative to the polarization direction of the first reference signal as 1; or when the degree of direction approximation between the polarization direction and the vertical polarization direction of the first reference signal is not higher than the degree of direction approximation between the polarization direction and the horizontal polarization direction of the first reference signal, determine a proportion-related value of the vertical polarization direction relative to the polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the processor 53 is configured to:

determine a signal strength of a first reference signal that is received by the UE by using the vertical polarization antenna, where the first reference signal is sent by one of the at least one access point;

determine whether the signal strength of the first reference signal that is received by using the vertical polarization antenna is greater than a preset vertical polarization signal threshold; and when the signal strength of the first reference signal that is received by using the vertical polarization antenna is greater than the preset vertical polarization signal threshold, determine a proportion-related value of a vertical polarization direction relative to a polarization direction of the first reference signal as 1; or when the signal strength of the first reference signal that is received by using the vertical polarization antenna is not greater than the preset vertical polarization signal threshold, determine a proportion-related value of a vertical polarization direction relative to a polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the processor 53 is configured to:

determine a signal strength of a first reference signal that is received by the UE by using the vertical polarization antenna, where the first reference signal is sent by one of the at least one access point;

determine a signal strength of the first reference signal that is received by the UE by using the horizontal polarization antenna; and determine a proportion-related value X of a vertical polarization direction relative to a polarization direction of the first reference signal according to a proportion-related value formula, where the proportion-related value formula is:

$$X = \arctan(M/N), \text{ where}$$

M is the signal strength of the first reference signal that is received by the UE by using the vertical polarization antenna, and N is the signal strength of the first reference signal that is received by the UE by using the horizontal polarization antenna.

Optionally, the measurement information further includes a measurement value of a preset measurement parameter of the reference signal corresponding to the at least one access point identifier, and the preset measurement parameter includes at least one of a reference signal received power (RSRP), a time of arrival (TOA), and an angle of arrival (AOA).

In this embodiment of the present disclosure, the receiver can receive the reference signal sent by the at least one access point in the indoor environment in which the UE is located, the processor determines the measurement information based on the polarization direction of the at least one received reference signal, and the transmitter sends the measurement information to the positioning server; and correspondingly, the positioning server can determine the floor location of the UE based on the measurement information. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

Figure 6:
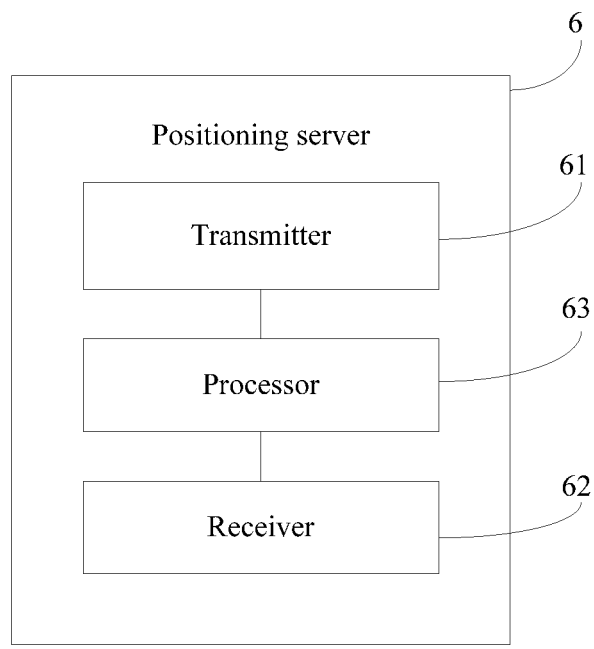
FIG. 6 is a schematic structural diagram of a positioning server according to an example embodiment of the present disclosure.

FIG. 6 is a schematic structural diagram of a positioning server 6 according to an embodiment of the present disclosure. The positioning server 6 includes a transmitter 61, a receiver 62, and a processor 63, where the receiver 62 is configured to receive measurement information sent by user equipment (UE), where the measurement information is determined, after the UE receives a reference signal sent by at least one access point in an indoor environment in which the UE is located, based on a polarization direction of the at least one received reference signal, and the measurement information includes at least one access point identifier and a proportion-related value of a vertical polarization direction relative to the polarization direction of the reference signal corresponding to the at least one access point identifier;

the processor 63 is configured to determine a floor location of the UE based on the measurement information; and the transmitter 61 is configured to send location information of the UE to the UE, where the location information of the UE includes the floor location of the UE.

Optionally, the processor 63 is configured to:

determine a target access point identifier from the at least one access point identifier based on the proportion-related value of the vertical polarization direction relative to the polarization direction of the reference signal corresponding to the at least one access point identifier;

query a preset correspondence between an access point identifier and a floor based on the target access point identifier; and determine a floor corresponding to the target access point identifier as the floor location of the UE.

Optionally, the processor 63 is configured to use an access point identifier, in the at least one access point identifier, corresponding to a largest proportion-related value of a vertical polarization direction as the target access point identifier.

Optionally, the measurement information further includes a measurement value of a preset measurement parameter of the reference signal corresponding to the at least one access point identifier, and the preset measurement parameter includes at least one of a reference signal received power (RSRP), a time of arrival (TOA), and an angle of arrival (AOA); and the processor 63 is configured to:

obtain a measurement value of a preset measurement parameter corresponding to each of the at least one access point identifier;

obtain, through sorting based on the measurement value, a first priority corresponding to each access point identifier;

obtain, through sorting based on the proportion-related value of the vertical polarization direction, a second priority corresponding to each access point identifier;

obtain a weighted average value of the first priority corresponding to each access point identifier and the second priority corresponding to each access point identifier, to obtain a target priority of each access point identifier; and use, as the target access point identifier, an access point identifier with a highest target priority in the at least one access point identifier.

In this embodiment of the present disclosure, the processor can determine the floor location of the UE based on the measurement information received by the receiver, where the measurement information is determined, after the UE receives the reference signal sent by the at least one access point in the indoor environment in which the UE is located, based on the polarization direction of the at least one received reference signal. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

An embodiment of the present disclosure provides a floor positioning system, including the UE 5 shown in FIG. 5, the positioning server 6 shown in FIG. 6, and at least one access point.

Figure 7:
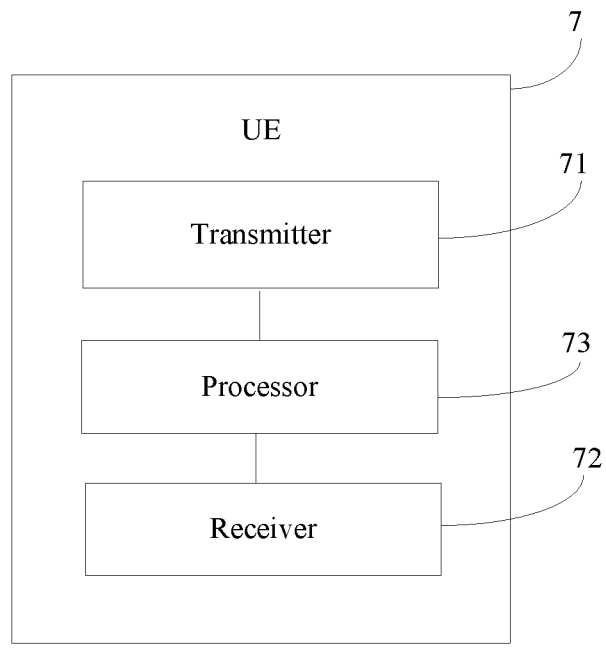
FIG. 7 is a schematic structural diagram of another UE according to an example embodiment of the present disclosure.

FIG. 7 is a schematic structural diagram of UE 7 according to an embodiment of the present disclosure. The UE 7 includes a transmitter 71, a receiver 72, and a processor 73, where the receiver 72 is configured to receive a reference signal sent by at least one access point in an indoor environment in which the UE is located;

the processor 73 is configured to determine a proportion-related value of a vertical polarization direction relative to a polarization direction of the at least one received reference signal, where the at least one reference signal is corresponding to at least one access point identifier;

the processor 73 is further configured to determine a target access point identifier from the at least one access point identifier based on the proportion-related value of the vertical polarization direction relative to the polarization direction of the at least one received reference signal;

the transmitter 71 is configured to send measurement information to a positioning server, where the measurement information includes the target access point identifier; and the receiver 72 is further configured to receive location information of the UE sent by the positioning server, where the location information of the UE includes a floor location of the UE, and the floor location of the UE is determined based on the measurement information.

Optionally, the processor 73 is configured to:

use an access point identifier, in the at least one access point identifier, corresponding to a reference signal with a largest proportion-related value of a vertical polarization direction as the target access point identifier.

Optionally, the processor 73 is configured to:

obtain a measurement value of a preset measurement parameter of the reference signal corresponding to the at least one access point identifier, where the preset measurement parameter includes at least one of a reference signal received power (RSRP), a time of arrival (TOA), and an angle of arrival (AOA);

obtain, through sorting based on the measurement value, a first priority corresponding to each of the at least one received reference signal;

obtain, through sorting based on the proportion-related value of the vertical polarization direction, a second priority corresponding to each reference signal;

obtain a weighted average value of the first priority corresponding to each reference signal and the second priority corresponding to each reference signal, to obtain a target priority of each reference signal; and use an access point identifier, in the at least one access point identifier, corresponding to a reference signal with a highest target priority as the target access point identifier.

Optionally, the processor 73 is configured to:

determine a degree of direction approximation between a polarization direction and a vertical polarization direction of a first reference signal, where the first reference signal is sent by one of the at least one access point;

determine a degree of direction approximation between the polarization direction and a horizontal polarization direction of the first reference signal, where the horizontal polarization direction is perpendicular to the vertical polarization direction;

determine whether the degree of direction approximation between the polarization direction and the vertical polarization direction of the first reference signal is higher than the degree of direction approximation between the polarization direction and the horizontal polarization direction of the first reference signal; and when the degree of direction approximation between the polarization direction and the vertical polarization direction of the first reference signal is higher than the degree of direction approximation between the polarization direction and the horizontal polarization direction of the first reference signal, determine a proportion-related value of the vertical polarization direction relative to the polarization direction of the first reference signal as 1; or when the degree of direction approximation between the polarization direction and the vertical polarization direction of the first reference signal is not higher than the degree of direction approximation between the polarization direction and the horizontal polarization direction of the first reference signal, determine a proportion-related value of the vertical polarization direction relative to the polarization direction of the first reference signal as 0.

Optionally, a vertical polarization antenna and a horizontal polarization antenna are disposed in the UE, and a signal sending/receiving direction of the vertical polarization antenna is perpendicular to that of the horizontal polarization antenna; and the processor 73 is configured to:

determine a signal strength of a first reference signal that is received by the UE by using the vertical polarization antenna, where the first reference signal is sent by one of the at least one access point;

determine whether the signal strength of the first reference signal that is received by using the vertical polarization antenna is greater than a preset vertical polarization signal threshold; and when the signal strength of the first reference signal that is received by using the vertical polarization antenna is greater than the preset vertical polarization signal threshold, determine a proportion-related value of a vertical polarization direction relative to a polarization direction of the first reference signal as 1; or when the signal strength of the first reference signal that is received by using the vertical polarization antenna is not greater than the preset vertical polarization signal threshold, determine a proportion-related value of a vertical polarization direction relative to a polarization direction of the first reference signal as 0.

Optionally, a vertical polarization antenna and a horizontal polarization antenna are disposed in the UE; and the processor 73 is configured to:

determine a signal strength of a first reference signal that is received by the UE by using the vertical polarization antenna, where the first reference signal is sent by one of the at least one access point;

determine a signal strength of the first reference signal that is received by the UE by using the horizontal polarization antenna; and determine a proportion-related value X of a vertical polarization direction relative to a polarization direction of the first reference signal according to a proportion-related value formula, where the proportion-related value formula is:

$$X = \arctan(M/N), \text{ where}$$

M is the signal strength of the first reference signal that is received by the UE by using the vertical polarization antenna, and N is the signal strength of the first reference signal that is received by the UE by using the horizontal polarization antenna.

In this embodiment of the present disclosure, the receiver can receive the reference signal sent by the at least one access point in the indoor environment in which the UE is located, the processor determines the measurement information based on the polarization direction of the at least one received reference signal, and the transmitter sends the measurement information to the positioning server; and correspondingly, the positioning server can determine the floor location of the UE based on the measurement information. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

Figure 8:
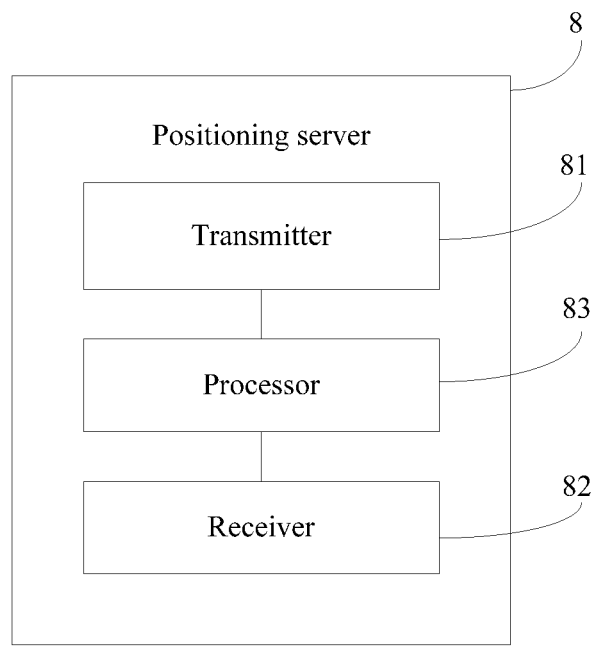
FIG. 8 is a schematic structural diagram of another positioning server according to an example embodiment of the present disclosure.

FIG. 8 is a schematic structural diagram of a positioning server 8 according to an embodiment of the present disclosure. The positioning server 8 includes a transmitter 81, a receiver 82, and a processor 83, where the receiver 82 is configured to receive measurement information sent by user equipment (UE), where the measurement information includes a target access point identifier, the target access point identifier is determined, after the UE receives a reference signal sent by at least one access point in an indoor environment in which the UE is located and a proportion-related value of a vertical polarization direction relative to a polarization direction of the at least one received reference signal is determined, from at least one access point identifier based on the proportion-related value of the vertical polarization direction relative to the polarization direction of the at least one received reference signal, and the at least one reference signal is corresponding to the at least one access point identifier;

the processor 83 is configured to determine a floor location of the UE based on the measurement information; and the transmitter 81 is configured to send location information of the UE to the UE, where the location information of the UE includes the floor location of the UE.

Optionally, the processor 83 is configured to:

query a preset correspondence between an access point identifier and a floor based on the target access point identifier; and determine a floor corresponding to the target access point identifier as the floor location of the UE.

In this embodiment of the present disclosure, the processor can determine the floor location of the UE based on the measurement information received by the receiver, where the measurement information includes the target access point identifier, and the target access point identifier is determined, after the UE receives the reference signal sent by the at least one access point in the indoor environment in which the UE is located and the proportion-related value of the vertical polarization direction relative to the polarization direction of the at least one received reference signal is determined, from the at least one access point identifier based on the proportion-related value of the vertical polarization direction relative to the polarization direction of the at least one received reference signal. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

An embodiment of the present disclosure provides a floor positioning system, including the UE 7 shown in FIG. 7, the positioning server 8 shown in FIG. 8, and at least one access point.

Figure 9:
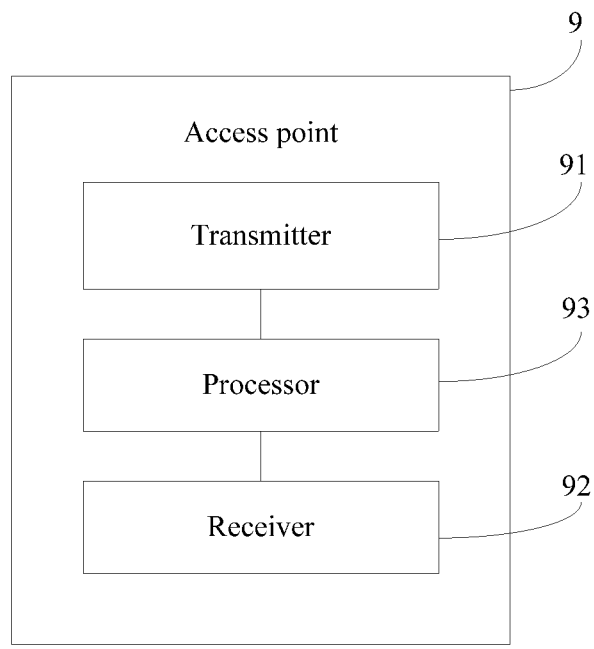
FIG. 9 is a schematic structural diagram of an access point according to an example embodiment of the present disclosure.

FIG. 9 is a schematic structural diagram of an access point 9 according to an embodiment of the present disclosure. The access point 9 includes a transmitter 91, a receiver 92, and a processor 93, where the receiver 92 is configured to receive a reference signal sent by UE in an indoor environment in which the access point is located;

the processor 93 is configured to determine measurement information based on a polarization direction of the received reference signal, where the measurement information includes an access point identifier of the access point and a proportion-related value of a vertical polarization direction relative to the polarization direction of the reference signal corresponding to the access point identifier; and the transmitter 91 is configured to send the measurement information to a positioning server, so that the positioning server determines a floor location of the UE based on the measurement information, and sends the floor location of the UE to the UE.

Optionally, the processor 93 is configured to:

determine a degree of direction approximation between the polarization direction and the vertical polarization direction of the reference signal;

determine a degree of direction approximation between the polarization direction and a horizontal polarization direction of the reference signal, where the horizontal polarization direction is perpendicular to the vertical polarization direction;

determine whether the degree of direction approximation between the polarization direction and the vertical polarization direction of the reference signal is higher than the degree of direction approximation between the polarization direction and the horizontal polarization direction of the reference signal; and when the degree of direction approximation between the polarization direction and the vertical polarization direction of the reference signal is higher than the degree of direction approximation between the polarization direction and the horizontal polarization direction of the reference signal, determine the proportion-related value of the vertical polarization direction relative to the polarization direction of the reference signal as 1; or when the degree of direction approximation between the polarization direction and the vertical polarization direction of the reference signal is not higher than the degree of direction approximation between the polarization direction and the horizontal polarization direction of the reference signal, determine the proportion-related value of the vertical polarization direction relative to the polarization direction of the reference signal as 0.

Optionally, a vertical polarization antenna and a horizontal polarization antenna are disposed in the access point, and a signal sending/receiving direction of the vertical polarization antenna is perpendicular to that of the horizontal polarization antenna; and the processor 93 is configured to:

determine a signal strength of the reference signal that is received by the access point by using the vertical polarization antenna; and determine whether the signal strength of the reference signal that is received by using the vertical polarization antenna is greater than a preset vertical polarization signal threshold; and when the signal strength of the reference signal that is received by using the vertical polarization antenna is greater than the preset vertical polarization signal threshold, determine the proportion-related value of the vertical polarization direction relative to the polarization direction of the reference signal as 1; or when the signal strength of the reference signal that is received by using the vertical polarization antenna is not greater than the preset vertical polarization signal threshold, determine the proportion-related value of the vertical polarization direction relative to the polarization direction of the reference signal as 0.

Optionally, a vertical polarization antenna and a horizontal polarization antenna are disposed in the access point, and a signal sending/receiving direction of the vertical polarization antenna is perpendicular to that of the horizontal polarization antenna; and the processor 93 is configured to:

determine a signal strength of the reference signal that is received by the access point by using the vertical polarization antenna; and determine a signal strength of the reference signal that is received by the access point by using the horizontal polarization antenna; and determine the proportion-related value X of the vertical polarization direction relative to the polarization direction of the reference signal according to a proportion-related value formula, where the proportion-related value formula is:

$X=\arctan(M/N)$, where

M is the signal strength of the reference signal that is received by the access point by using the vertical polarization antenna, and N is the signal strength of the reference signal that is received by the access point by using the horizontal polarization antenna.

Optionally, the measurement information further includes a measurement value of a preset measurement parameter of the reference signal corresponding to the access point identifier, and the preset measurement parameter includes at least one of a reference signal received power (RSRP), a time of arrival (TOA), and an angle of arrival (AOA).

In this embodiment of the present disclosure, the receiver can receive the reference signal sent by the UE in the indoor environment in which the access point is located, the processor determines the measurement information based on the polarization direction of the received reference signal, and the transmitter sends the measurement information to the positioning server; and correspondingly, the positioning server determines the floor location of the UE based on the measurement information, and sends the floor location to the UE. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

Figure 10:
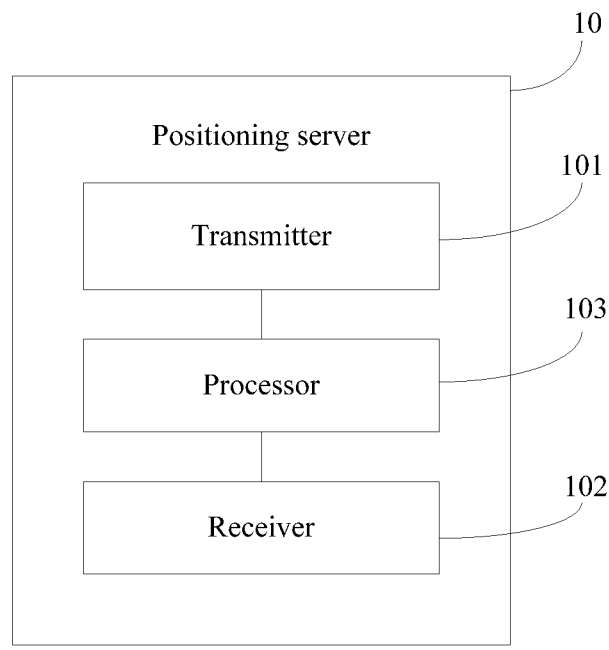
FIG. 10 is a schematic structural diagram of still another positioning server according to an example embodiment of the present disclosure.

FIG. 10 is a schematic structural diagram of a positioning server 10 according to an embodiment of the present disclosure. The positioning server 10 includes a transmitter 101, a receiver 102, and a processor 103, where the receiver 102 is configured to receive measurement information sent by at least one access point, where the at least one piece of received measurement information is determined, after the at least one access point receives a reference signal sent by UE in an indoor environment in which the at least one access point is located, based on a polarization direction of the received reference signal, and each piece of measurement information includes an access point identifier and a proportion-related value of a vertical polarization direction relative to the polarization direction of the reference signal corresponding to the access point identifier;

the processor 103 is configured to determine a floor location of the UE based on the at least one piece of received measurement information; and the transmitter 101 is configured to send location information of the UE to the UE, where the location information of the UE includes the floor location of the UE.

Optionally, the processor 103 is configured to:

determine a target access point identifier based on the proportion-related value of the vertical polarization direction relative to the polarization direction of the reference signal corresponding to the access point identifier in the at least one piece of received measurement information;

query a preset correspondence between an access point identifier and a floor based on the target access point identifier; and determine a floor corresponding to the target access point identifier as the floor location of the UE.

Optionally, the processor 103 is configured to:

use an access point identifier, in the at least one piece of received measurement information, corresponding to a largest proportion-related value of a vertical polarization direction as the target access point identifier.

Optionally, each piece of measurement information further includes a measurement value of a preset measurement parameter of the reference signal corresponding to the access point identifier, and the preset measurement parameter includes at least one of a reference signal received power (RSRP), a time of arrival (TOA), and an angle of arrival (AOA); and the processor 103 is configured to:

obtain a measurement value of a preset measurement parameter corresponding to each access point identifier in the at least one piece of received measurement information;

obtain, through sorting based on the measurement value, a first priority corresponding to each access point identifier;

obtain, through sorting based on the proportion-related value of the vertical polarization direction, a second priority corresponding to each access point identifier;

obtain a weighted average value of the first priority corresponding to each access point identifier and the second priority corresponding to each access point identifier, to obtain a target priority of each access point identifier; and use an access point identifier with a highest target priority as the target access point identifier.

In this embodiment of the present disclosure, the processor determines the floor location of the UE based on the measurement information that is sent by the at least one access point and that is received by the receiver, and sends the floor location of the UE to the UE, where the at least one piece of received measurement information is determined, after the at least one access point receives the reference signal sent by the UE in the indoor environment in which the at least one access point is located, based on the polarization direction of the received reference signal, and each piece of measurement information includes the access point identifier and the proportion-related value of the vertical polarization direction relative to the polarization direction of the reference signal corresponding to the access point identifier. A polarization direction of a reference signal reflects two parameters: a signal strength and a signal propagation direction of a reference signal, and parameters used for floor determining are richer than that used for floor determining performed by merely using a method for sorting RSRPs or TOAs in a related technology. Therefore, the floor location of the UE can be accurately obtained.

An embodiment of the present disclosure provides a floor positioning system, including:

the access point 9 shown in FIG. 9, the positioning server 10 shown in FIG. 10, and UE.

It may be clearly understood by a person skilled in the art that, for the purpose of convenient and brief description, for a detailed working process of the foregoing system, device, and module, reference may be made to a corresponding process in the foregoing method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method of determining position applied to user equipment (UE), comprising:
receiving a reference signal sent by at least one access point in an indoor environment in which the UE is located;
determining measurement information based on a polarization direction of the at least one received reference signal, the measurement information comprising at least one access point identifier and a proportion-related value of a vertical polarization direction relative to the polarization direction of the reference signal corresponding to the at least one access point identifier;
sending the measurement information to a positioning server; and
receiving location information of the UE sent by the positioning server, the location information of the UE comprising a floor location of the UE, and the floor location of the UE is determined based on the measurement information.

2. The method according to claim 1, wherein the determining measurement information based on a polarization direction of the at least one received reference signal comprises:
determining a degree of direction approximation between a polarization direction and a vertical polarization direction of a first reference signal, wherein the first reference signal is sent by one of the at least one access point;
determining a degree of direction approximation between the polarization direction and a horizontal polarization direction of the first reference signal, wherein the horizontal polarization direction is perpendicular to the vertical polarization direction;
determining whether the degree of direction approximation between the polarization direction and the vertical polarization direction of the first reference signal is higher than the degree of direction approximation between the polarization direction and the horizontal polarization direction of the first reference signal; and
when the degree of direction approximation between the polarization direction and the vertical polarization direction of the first reference signal is higher than the degree of direction approximation between the polarization direction and the horizontal polarization direction of the first reference signal, determining a proportion-related value of the vertical polarization direction relative to the polarization direction of the first reference signal as 1; or
when the degree of direction approximation between the polarization direction and the vertical polarization direction of the first reference signal is not higher than the degree of direction approximation between the polarization direction and the horizontal polarization direction of the first reference signal, determining a proportion-related value of the vertical polarization direction relative to the polarization direction of the first reference signal as 0.

3. The method according to claim 1, wherein a vertical polarization antenna and a horizontal polarization antenna are included in the UE, and a signal sending/receiving direction of the vertical polarization antenna is perpendicular to that of the horizontal polarization antenna; and the determining measurement information based on a polarization direction of the at least one received reference signal comprises:
determining a signal strength of a first reference signal received by the UE by using the vertical polarization antenna, wherein the first reference signal is sent by one of the at least one access point;
determining whether the signal strength of the first reference signal received by using the vertical polarization antenna is greater than a preset vertical polarization signal threshold; and
when the signal strength of the first reference signal received by using the vertical polarization antenna is greater than the preset vertical polarization signal threshold, determining a proportion-related value of a vertical polarization direction relative to a polarization direction of the first reference signal as 1; or
when the signal strength of the first reference signal received by using the vertical polarization antenna is not greater than the preset vertical polarization signal threshold, determining a proportion-related value of a vertical polarization direction relative to a polarization direction of the first reference signal as 0.

4. The method according to claim 1, wherein a vertical polarization antenna and a horizontal polarization antenna are included in the UE, and a signal sending/receiving direction of the vertical polarization antenna is perpendicular to that of the horizontal polarization antenna; and the determining measurement information based on a polarization direction of the at least one received reference signal comprises:
determining a signal strength of a first reference signal received by the UE by using the vertical polarization antenna, wherein the first reference signal is sent by one of the at least one access point;
determining a signal strength of the first reference signal received by the UE by using the horizontal polarization antenna; and
determining a proportion-related value X of a vertical polarization direction relative to a polarization direction of the first reference signal according to a proportion-related value formula, wherein the proportion-related value formula is:

$$X = \arctan(M/N), \text{ wherein}$$

M is the signal strength of the first reference signal received by the UE by using the vertical polarization antenna, and N is the signal strength of the first reference signal received by the UE by using the horizontal polarization antenna.

5. The method according to claim 1, wherein the measurement information further comprises a measurement value of a preset measurement parameter of the reference signal corresponding to the at least one access point identifier, and the preset measurement parameter comprises at least one of a reference signal received power (RSRP), a time of arrival (TOA), and an angle of arrival (AOA).

6. User equipment (UE), comprising:
a receiver configured to receive a reference signal sent by at least one access point in an indoor environment in which the UE is located;

a processor configured to determine measurement information based on a polarization direction of the at least one received reference signal, the measurement information comprising at least one access point identifier and a proportion-related value of a vertical polarization direction relative to the polarization direction of the reference signal corresponding to the at least one access point identifier;

a transmitter configured to send the measurement information to a positioning server; and the receiver is further configured to receive location information of the UE sent by the positioning server, the location information of the UE comprising a floor location of the UE, and the floor location of the UE is determined based on the measurement information.

7. The user equipment (UE) according to claim 6, wherein the processor is configured to:

determine a degree of direction approximation between a polarization direction and a vertical polarization direction of a first reference signal, wherein the first reference signal is sent by one of the at least one access point;

determine a degree of direction approximation between the polarization direction and a horizontal polarization direction of the first reference signal, wherein the horizontal polarization direction is perpendicular to the vertical polarization direction;

determine whether the degree of direction approximation between the polarization direction and the vertical polarization direction of the first reference signal is higher than the degree of direction approximation between the polarization direction and the horizontal polarization direction of the first reference signal; and when the degree of direction approximation between the polarization direction and the vertical polarization direction of the first reference signal is higher than the degree of direction approximation between the polarization direction and the horizontal polarization direction of the first reference signal, determine a proportion-related value of the vertical polarization direction relative to the polarization direction of the first reference signal as 1; or when the degree of direction approximation between the polarization direction and the vertical polarization direction of the first reference signal is not higher than the degree of direction approximation between the polarization direction and the horizontal polarization direction of the first reference signal, determine a proportion-related value of the vertical polarization direction relative to the polarization direction of the first reference signal as 0.

8. The user equipment (UE) according to claim 6, wherein a vertical polarization antenna and a horizontal polarization antenna are included in the UE, and a signal sending/receiving direction of the vertical polarization antenna is perpendicular to that of the horizontal polarization antenna; and the processor is configured to:

determine a signal strength of a first reference signal received by the UE by using the vertical polarization antenna, wherein the first reference signal is sent by one of the at least one access point;

determine whether the signal strength of the first reference signal received by using the vertical polarization antenna is greater than a preset vertical polarization signal threshold; and when the signal strength of the first reference signal received by using the vertical polarization antenna is greater than the preset vertical polarization signal threshold, determine a proportion-related value of a vertical polarization direction relative to a polarization direction of the first reference signal as 1; or when the signal strength of the first reference signal received by using the vertical polarization antenna is not greater than the preset vertical polarization signal threshold, determine a proportion-related value of a vertical polarization direction relative to a polarization direction of the first reference signal as 0.

9. The user equipment (UE) according to claim 6, wherein a vertical polarization antenna and a horizontal polarization antenna are included in the UE, and a signal sending/receiving direction of the vertical polarization antenna is perpendicular to that of the horizontal polarization antenna; and the processor is configured to:

determine a signal strength of a first reference signal received by the UE by using the vertical polarization antenna, wherein the first reference signal is sent by one of the at least one access point;

determine a signal strength of the first reference signal received by the UE by using the horizontal polarization antenna; and determine a proportion-related value X of a vertical polarization direction relative to a polarization direction of the first reference signal according to a proportion-related value formula, wherein the proportion-related value formula is:

$$X = \arctan(M/N), \text{ wherein}$$

M is the signal strength of the first reference signal received by the UE by using the vertical polarization antenna, and N is the signal strength of the first reference signal received by the UE by using the horizontal polarization antenna.

10. The user equipment (UE) according to claim 6, wherein the measurement information further comprises a measurement value of a preset measurement parameter of the reference signal corresponding to the at least one access point identifier, and the preset measurement parameter comprises at least one of a reference signal received power (RSRP), a time of arrival (TOA), and an angle of arrival (AOA).

11. A positioning server, comprising:

a receiver configured to receive measurement information sent by user equipment (UE), wherein the measurement information is determined, after the UE receives a reference signal sent by at least one access point in an indoor environment in which the UE is located, based on a polarization direction of the at least one received reference signal, and the measurement information comprises at least one access point identifier and a proportion-related value of a vertical polarization direction relative to the polarization direction of the reference signal corresponding to the at least one access point identifier;

a processor configured to determine a floor location of the UE based on the measurement information; and a transmitter configured to send location information of the UE to the UE, wherein the location information of the UE comprises the floor location of the UE.

12. The positioning server according to claim 11, wherein the processor is configured to:

determine a target access point identifier from the at least one access point identifier based on the proportion-related value of the vertical polarization direction relative to the polarization direction of the reference signal corresponding to the at least one access point identifier;

query a preset correspondence between an access point identifier and a floor based on the target access point identifier; and determine a floor corresponding to the target access point identifier as the floor location of the UE.

13. The positioning server according to claim 12, wherein the processor is configured to use an access point identifier, in the at least one access point identifier, corresponding to a largest proportion-related value of a vertical polarization direction as the target access point identifier.

14. The positioning server according to claim 12, wherein the measurement information further comprises a measurement value of a preset measurement parameter of the reference signal corresponding to the at least one access point identifier, and the preset measurement parameter comprises at least one of a reference signal received power (RSRP), a time of arrival (TOA), and an angle of arrival (AOA); and the processor is configured to:

obtain a measurement value of a preset measurement parameter corresponding to each of the at least one access point identifier;

obtain, through sorting based on the measurement value, a first priority corresponding to each access point identifier;

obtain, through sorting based on the proportion-related value of the vertical polarization direction, a second priority corresponding to each access point identifier;

obtain a weighted average value of the first priority corresponding to each access point identifier and the second priority corresponding to each access point identifier, to obtain a target priority of each access point identifier; and use, as the target access point identifier, an access point identifier with a highest target priority in the at least one access point identifier.

* * * * *